(12) United States Patent
Maruyama

(10) Patent No.: US 8,752,120 B2
(45) Date of Patent: Jun. 10, 2014

(54) DIGITAL BROADCASTING RECEIVING APPARATUS AND METHOD FOR CONTROLLING THE SAME

(75) Inventor: Kazuna Maruyama, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 398 days.

(21) Appl. No.: 12/888,487

(22) Filed: Sep. 23, 2010

(65) Prior Publication Data

US 2011/0075029 A1 Mar. 31, 2011

(30) Foreign Application Priority Data

Sep. 30, 2009 (JP) ................................ 2009-226578
Jul. 28, 2010 (JP) ................................ 2010-169304

(51) Int. Cl.
*H04N 21/485* (2011.01)
*H04N 21/488* (2011.01)

(52) U.S. Cl.
CPC ........ *H04N 21/4884* (2013.01); *H04N 21/4888* (2013.01); *H04N 21/4856* (2013.01)
USPC ............ 725/136; 725/132; 725/152; 348/468

(58) Field of Classification Search
USPC ........................................................ 348/468
See application file for complete search history.

(56) References Cited

U.S. PATENT DOCUMENTS 5,757,437 A * 5/1998 Song .............................. 348/564
6,320,621 B1 * 11/2001 Fu ................................. 348/465
2002/0199209 A1 * 12/2002 Shiga ............................. 725/136
2006/0109378 A1 * 5/2006 Yang et al. ..................... 348/465
2006/0114350 A1 * 6/2006 Shimada et al. ........... 348/423.1
2006/0272000 A1 11/2006 Kwak et al.
2009/0022154 A1 * 1/2009 Kiribe et al. .................. 370/390
2009/0034931 A1 * 2/2009 Stone et al. ..................... 386/52
2009/0185795 A1 * 7/2009 Itani et al. ..................... 386/131

FOREIGN PATENT DOCUMENTS

JP 2003-274307 A 9/2003
JP 2006-333460 12/2006
JP 2006-333460 A 12/2006

OTHER PUBLICATIONS

The above reference was cited in a Aug. 23, 2011 Japanese Office Action, which is enclosed without an English Translation, that issued in Japanese Patent Application No. 2010-169304.

* cited by examiner

*Primary Examiner* — Bennett Ingvoldstad

(74) *Attorney, Agent, or Firm* — Cowan, Liebowitz & Latman, P.C.

(57) ABSTRACT

A choice specifying unit 500 specifies, as displayable subtitles, standard subtitles which a subtitle processing unit 300 can decode using a standard function, and expanded subtitles which the subtitle processing unit 300 can decode by an application processing unit 900 executing character expansion applications that can be obtained from data broadcasting. A user interface unit 200 displays a subtitle switching screen on a monitor 30 as a user interface which can present the specified displayable subtitles as choices of switchable subtitles when a user presses a "Subtitle" button, and in the subtitle switching screen the user can select one subtitle out of the presented choices as a subtitle to be superimposed on an image.

14 Claims, 16 Drawing Sheets

| Subtitle Management Data | | | Character Support Information | | Support Possibility Determination Result |
|---|---|---|---|---|---|
| Expansion Flag | Character Encoding Method | Language Code | Character Encoding Method | Language Code | |
| On | 8-Unit Encoding | Hangul | Supported | Supported | Decoding Possible |
| | | Arabic | | Not Supported | Decoding Impossible |
| | UCS | Hangul | Not Supported | Supported | |
| | | Arabic | | Not Supported | |

FIG.4

```
<bml>
 <head>
  <title></title>
  <style></style>
  <script>
function hangul() {
   browser.launchXlet("jimaku_hangul");    ------ (a)
}
function arabic() {
   browser.launchXlet("jimaku_arabic");    ------ (b)
}
function game() {
   browser.launchXlet("game");             ------ (c)
}
function weather(){
   browser.launchDocument("~/0001/weather.bml");
}
  </script>
 </head>
 <body>
   ......
(A)   <div id="hangul" onkeydown="hangul();"  ...>Hangul Subtitle
       <object data="hangul.jpg" type="image/jpeg".../>
      </div>

(B)   <div id="arabic" onkeydown="arabic();"  ...>Arabic Subtitle
       <object data="arabic.jpg" type="image/jpeg".../>
      </div>
   ......
(C)   <div id="game" onkeydown="game();"  ...>Game Acquisition
       <object data="game.jpg" type="image/jpeg".../>
      </div>
   ......
      <div id="weather" onkeydown="weather();"  ...>Weather
Information
       <object data="weather.jpg" type="image/jpeg".../>
      </div>
   ......
 </body>
</bml>
```

FIG.14

DIGITAL BROADCASTING RECEIVING APPARATUS AND METHOD FOR CONTROLLING THE SAME

BACKGROUND OF THE INVENTION

1. Field of the Invention

The present invention relates to a digital broadcasting receiving apparatus and a method for controlling this apparatus.

2. Description of the Related Art

In digital broadcasting, including ground digital broadcasting and satellite digital broadcasting, various advanced services are expected to be provided in the future. One such service that is attracting attention is an expanded subtitling service which allows the display of multi-language subtitles.

Japanese Patent Application Laid-Open No. 2006-333460 discloses an apparatus and a method for providing additional information using an expanded subtitle file, which provides a higher volume of additional information to users by attaching additional information on images and subtitles to a synchronous subtitle file.

To switch the display of subtitles or to select a subtitle language provided by the current subtitling service (called "standard subtitling service"), the "Subtitle" button on a remote controller is normally operated. To switch display of the subtitles or to select the subtitle language in the expanded subtitling service, on the other hand, operation on the data broadcasting screen is assumed. In a possible service accessing format, for example, operating the "d" button causes the available subtitles, such as "English subtitle" and "Arabic subtitle", to be displayed on the data broadcasting screen, and the user selects a desired subtitle from the displayed subtitles, and then the selected subtitle is displayed.

If such an expanded subtitling service is provided in addition to the standard subtitling service, the user must perform different operations to access the services, even though both are services for using subtitles. It is also possible that the user may not recognize that an expanded subtitling service is being provided for a program until the user watches the data broadcasting screen, therefore the expanded subtitling service may not be used effectively.

SUMMARY OF THE INVENTION

With the foregoing in view, the present invention provides a digital broadcasting receiving apparatus and a method for controlling the apparatus, which allows the user to access both the standard subtitling service and the expanded subtitling service using a common user interface, without being conscious of the difference of the mode of providing each subtitling service.

The present invention in its first aspect provides a digital broadcasting receiving apparatus for receiving digital broadcasting program data, comprising:

a receiving unit which receives digital broadcasting program data, including subtitle text data of standard subtitles and expanded subtitles, and character expansion applications corresponding to the expanded subtitles;

a subtitle processing unit which can obtain the subtitle text data of the standard subtitles from the digital broadcasting program data and decode the subtitle text data;

a user interface unit which presents the standard subtitles and expanded subtitles as choices of subtitles that a user can select; and an application processing unit which, when the user selects a choice of the expanded subtitle, obtains a character expansion application corresponding to the selected expanded subtitle from the digital broadcasting program data and executes the character expansion application, so that the subtitle processing unit can decode the subtitle text data of the expanded subtitle.

The present invention in its second aspect provides a digital broadcasting receiving apparatus for receiving digital broadcasting program data, comprising:

a receiving unit which receives digital broadcasting program data including subtitle text data of standard subtitles;

a subtitle processing unit which can obtain the subtitle text data of the standard subtitles from the digital broadcasting program data and decode the subtitle text data;

a specifying unit which obtains information indicating character expansion applications included in the digital broadcasting program data, and specifies the character expansion applications which can be obtained from the digital broadcasting program data;

a user interface unit which presents the standard subtitles and expanded subtitles corresponding to the character expansion applications which can be obtained as choices of subtitles that a user can select; and an application processing unit which, when the user selects a choice of the expanded subtitle, obtains a character expansion application corresponding to the selected expanded subtitle from the digital broadcasting program data, and executes the character expansion application, so as to decode subtitle text data of the expanded subtitles.

According to the present invention, a user can access both the standard subtitling service and the expanded subtitling service via a common user interface, without being conscious of the difference of the mode of providing each subtitling service.

Further features of the present invention will become apparent from the following description of exemplary embodiments with reference to the attached drawings.

BRIEF DESCRIPTION OF THE DRAWINGS

FIG. 4 shows an example of the support possibility determination result of Embodiment 1;

FIG. 14 shows an example of a BML document for the initial screen of Embodiment 3;

DESCRIPTION OF THE EMBODIMENTS (Embodiment 1)

Figure 1:
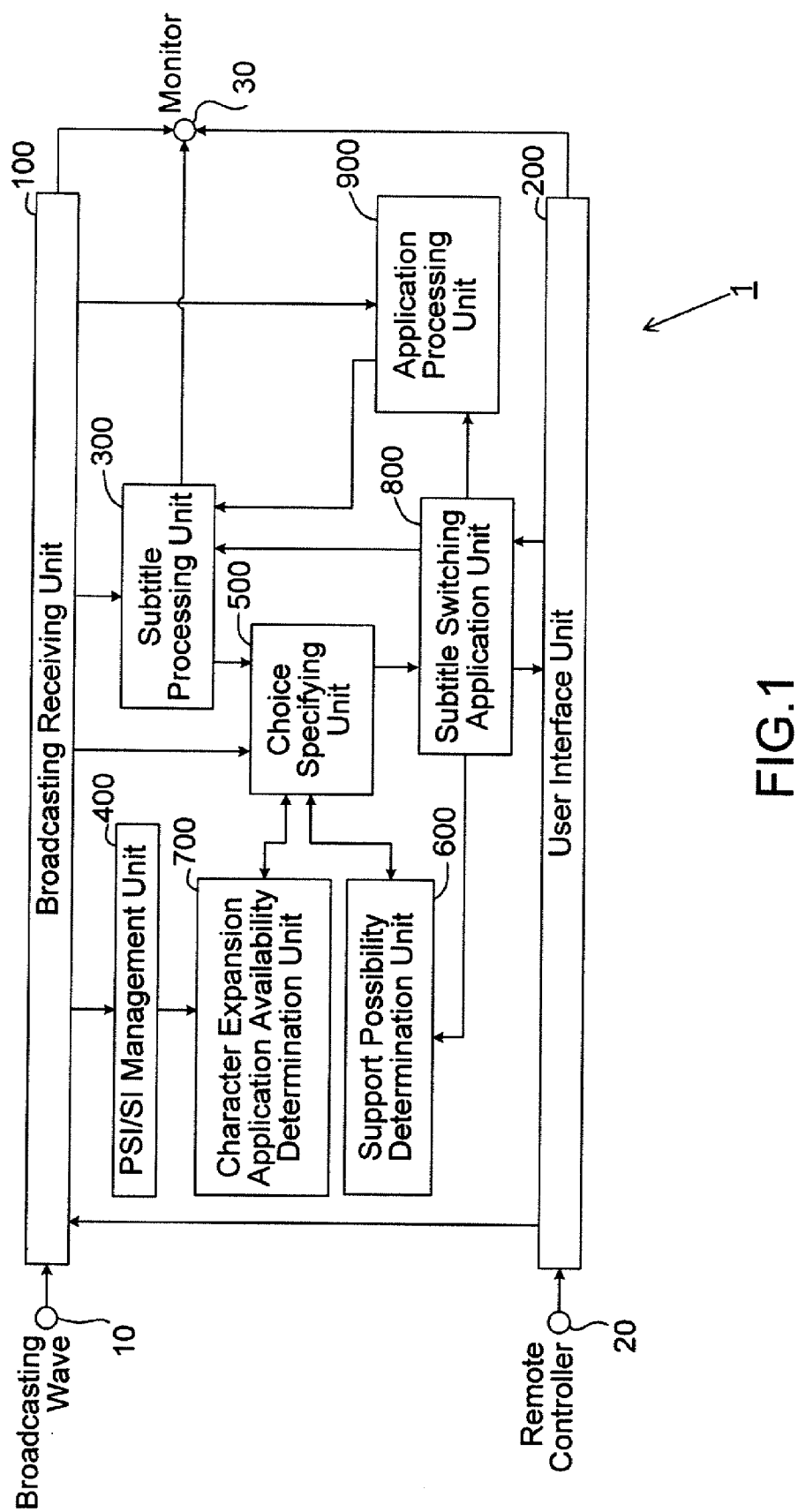
FIG. 1 is a functional block diagram of a digital broadcasting receiving apparatus of Embodiment 1.

FIG. 1 is a functional block diagram of a digital broadcasting receiving apparatus 1 according to a first embodiment of the present invention. The digital broadcasting receiving apparatus 1 is a receiver which receives broadcasting waves of digital broadcasting, and outputs the images and voices to a monitor 30 and a speaker, which is not illustrated. This embodiment is an example of applying the present invention to the digital broadcasting receiving apparatus 1 as a digital broadcasting receiver, but a digital broadcasting receiver, to which the present invention can be applied, is not limited to this. For example, the present invention can be applied to a tuner apparatus which receives digital broadcasting and outputs images and voices to an analog terminal and/or digital terminal (e.g. HDMI, IEEE 1394), or a recording apparatus which receives digital broadcasting and outputs and records images and voices to storage.

The digital broadcasting receiving apparatus 1 of this embodiment is a digital broadcasting receiver which can receive multiplexed data of digital broadcasting programs in which two types of subtitling services (standard subtitling service and expanded subtitling service) are provided. The subtitles which are provided to programs by the standard subtitling service (hereinafter referred to as "standard subtitles") are subtitles, the subtitle text data of the subtitle components of which can be decoded by a later mentioned subtitle processing unit 300 as a standard function of the digital broadcasting receiving apparatus 1. The display of the standard subtitles can be switched by operating the "Subtitle" button of the remote controller 20. The standard subtitling service is equivalent to a currently available subtitling service. The subtitles which are provided with programs by the expanded subtitling service (hereinafter referred to as "expanded subtitles") are subtitles, the subtitle text data of the subtitle components of which can be decoded by the subtitle processing unit 300 if a later mentioned application processing unit 900 executes a predetermined character expansion application. For the expanded subtitles, the display can be switched and the language can be selected on the data broadcasting screen, which is displayed by operating the "d" button of the remote controller 20.

<Broadcasting Receiving Unit 100>

A broadcasting receiving unit 100 demodulates the broadcasting waves of digital broadcasting which are input from a broadcasting wave inputting unit 10, receives the multiplexed data of a digital broadcasting program (digital broadcasting program data), which is multiplexed by the MPEG2-TS method, and separates the data into individual video, audio and data components. The broadcasting receiving unit 100 decodes the video component and outputs it to the monitor 30, and decodes the audio component and outputs it to a speaker, which is not illustrated. The data component includes multimedia data such as subtitles, captions, still images, graphics, videos, audios, applications, BML (Broadcast Markup Language) documents, and PSI/SI (Program Specific Information/Service Information). PSI/SI is data which includes the transmission control information required for the receiver to automatically perform demultiplexing and decoding, and the program lineup information required for the user to select services. The broadcasting receiving unit 100 transfers the subtitle component to the subtitle processing unit 300, the PSI/SI to the PSI/SI management unit 400, and an application to the application processing unit 900 respectively. If the broadcasting receiving unit 100 selects a program according to a program selection instruction from a user interface unit 200, the broadcasting receiving unit 100 notifies a choice specifying unit 500 that this program is selected. The broadcasting receiving unit 100 constitutes the "receiving unit" in the present invention.

<User Interface Unit 200>

The user interface unit 200 receives an instruction from the user as a signal from the remote controller 20, and controls the broadcasting receiving unit 100 and a subtitle switching application unit 800 so that the operation of the digital broadcasting receiving apparatus 1 is performed according to the instruction by the user.

If the user operates the remote controller 20 to select a program, and if this operation signal is received from the remote controller 20, the user interface unit 200 instructs the selected program to the broadcasting receiving unit 100.

If the user instructs to display the subtitle switching screen (pressing the "Subtitle" button of the remote controller 20 in the case of this embodiment), the user interface unit 200 instructs the subtitle switching application unit 800 to construct the subtitle switching screen. The subtitle switching screen is a screen for presenting the choices of the switchable subtitles to the user by displaying a list (described in detail later). The user interface unit 200 obtains the data on the subtitle switching screen, constructed by the subtitle switching application unit 800, from the subtitle switching application unit 800, and outputs it to the monitor 30.

If the user selects a desired subtitle out of the presented choices in the display of the subtitle switching screen, the user interface unit 200 instructs the subtitle switching application unit 800 to execute the switching processing to the selected subtitle. In this embodiment, the operation to select a desired subtitle out of the presented choices, like the subtitle selection screen is displayed, is performed by operating the cursor button or the decision button on the remote controller 20.

The user interface unit 200 outputs the GUI (e.g. choice of "YES" or "NO"), to assist the user in operating the remote controller 20, to the monitor 30.

The user interface unit 200 constitutes a part of the "interface unit" of the present invention. The means for inputting a signal to instruct the display of the subtitle switching screen to the user interface unit 200 is not limited to the user pressing the "Subtitle" button of the remote controller 20. Another means can be a button on the remote controller 20 which is specified to input this signal to the user interface unit 200, or a button on a TV main unit if the digital broadcasting receiving apparatus 1 is a digital TV. A signal to instruct the user interface unit 200 to display the subtitle switching screen may be input using a means other than these operations by the user. For example, a command, to instruct the user interface unit 200 to display the subtitle switching screen, is written in the BML document of the data broadcasting, which is linked to a program, so that the subtitle switching screen is automatically displayed when this program is selected.

<Subtitle Processing Unit 300>

The subtitle processing unit 300 obtains a subtitle component from the multiplexed data of the digital broadcasting program received by the broadcasting receiving unit 100, processes the obtained subtitle component, and outputs the subtitles to the monitor 30 so as to be synchronously superimposed and displayed on an image. The subtitle component is comprised of subtitle management data and subtitle text data.

The subtitle management data stores the language information of the subtitles (e.g. number of languages, character encoding method, language code, expansion flags) included in the subtitle component, display format information (e.g. 1920×1080 resolution and texts in vertical direction, 720×480 resolution and texts in horizontal direction), and display mode information (e.g. automatic display, selective display). The expansion flag is information to identify whether the data is standard subtitles or expanded subtitles, and is ON if it is extended subtitles, and OFF if it is standard subtitles.

The subtitle text data stores encoded subtitle text and information on subtitle presentation timing (time control mode and presentation start time).

The subtitle processing unit 300 transfers the subtitle management data to the choice specifying unit 500.

When the subtitle switching instruction is received from the subtitle switching application unit 800, the subtitle processing unit 300 obtains the subtitle component of the switching target subtitle, decodes the subtitle text data, and outputs the decoded data to the monitor 30 so that the subtitles are synchronously superimposed and displayed on an image.

The subtitle processing unit 300 can decode the subtitle text data, which is encoded by the character encoding method and language codes, which can be processed by the subtitle processing unit 300.

The subtitle text data of the standard subtitles is encoded by the character encoding method and language codes, which can be processed by the subtitle processing unit 300, using the standard function of the digital broadcasting receiving apparatus 1.

The subtitle text data of the expanded subtitles is encoded using a character encoding method or language codes that cannot be processed by the subtitle processing unit 300, using the standard function of the digital broadcasting receiving apparatus 1.

The character encoding method and language codes, which can be processed by the subtitle processing unit 300, can be expanded by executing the character expansion application which is provided through data broadcasting. The character expansion application is obtained and executed by the application processing unit 900.

The character encoding method and language codes that can be processed by the subtitle processing unit 300 are listed in the character support information held by the support possibility determination unit 600. If the character encoding method and language codes that can be processed by the subtitle processing unit 300 are expanded by the application processing unit 900 executing the character expansion application, the character support information is updated.

The subtitle processing unit 300 constitutes the "subtitle processing unit" in the present invention.

<PSI/SI Management Unit 400>

The PSI/SI management unit 400 obtains the PSI/SI from the broadcasting receiving unit 100, analyzes the obtained PSI/SI, and obtains the transmission control information and program lineup information. If an AIT (Application Information Table) is included in the PSI/SI, the PSI/SI management unit 400 transfers the AIT to the character expansion application availability determination unit 700. The AIT is a data storing list of applications provided through the data broadcasting, common information of the applications, and individual information of each application. The PSI/SI management unit 400 periodically obtains the PSI/SI from the broadcasting receiving unit 100, and updates the transmission control information and program lineup information to the latest information.

<Choice Specifying Unit 500>

The choice specifying unit 500 specifies displayable subtitles out of the subtitles provided for a program, and transfers the information on the specified displayable subtitles to the subtitle switching application unit 800.

The displayable subtitles are subtitles, the subtitle text data of which can be decoded by the subtitle processing unit 300, and subtitles for which the character expansion application, to enable decoding of the subtitle text data by the subtitle processing unit 300, is provided through the data broadcasting. The displayable subtitles include the standard subtitles. Among the expanded subtitles, expanded subtitles for which character expansion application have already been executed, or have not been executed yet but is provided through the data broadcasting, are included, execution of the character expansion application enables the subtitle processing unit 300 to process the character encoding method and language codes of the subtitle text data. Expanded subtitles include subtitles whose character encoding method and language codes cannot be processed by the subtitle processing unit 300 at the moment, and a character expansion application to enable this processing is not provided by the data broadcasting. Such expanded subtitles are not included in the list of displayable subtitles.

The choice specifying unit 500 specifies displayable subtitles, based on the subtitle management data obtained from the subtitle processing unit 300, the result of determination processing by the support possibility determination unit 600 (described later), and the result of determination processing by the character expansion application availability determination unit 700 (described later). Details on the processing of specifying the displayable subtitles by the choice specifying unit 500 will be described later.

The choice specifying unit 500 obtains, from the character expansion application availability determination unit 700, the information required for obtaining the character expansion application from the data broadcasting for enabling the subtitle processing unit 300 to decode the subtitle text data, and associates this information with the information on the displayable subtitles and transfers it to the subtitle switching application unit 800.

The choice specifying unit 500 constitutes the "specifying unit" in the present invention.

<Support Possibility Determination Unit 600>

The support possibility determination unit 600 determines, based on the character support information, whether the subtitle processing unit 300 can decode the subtitle text data of the subtitle instructed by the choice specifying unit 500. Details on the determination processing by the support possibility determination unit 600 will be described later.

<Character Expansion Application Availability Determination Unit 700>

The character expansion application availability determination unit 700 determines whether the character expansion application, which enables processing by the subtitle processing unit 300 using the character encoding method and language codes specified by the choice specifying unit 500, is provided by the data broadcasting accompanying the selected program. The character expansion application availability determination unit 700 performs this determination processing based on the AIT obtained from the PSI/SI management unit 400.

If the character expansion application is provided by the data broadcasting accompanying the selected program, the character expansion application availability determination unit 700 obtains information required for obtaining this character expansion application from the data broadcasting, and transfers this information to the choice specifying unit 500. Information required for obtaining the application is: module identification of the application resource; component tag of data carousel for transmitting the application; service identification; and transport stream identification or the like. The character expansion application availability determination unit 700 obtains information required for obtaining the application based on the AIT obtained from the PSI/SI management unit 400. Details on the determination processing by the character expansion application availability determination unit 700 will be described later.

<Subtitle Switching Application Unit 800>

Figure 16:
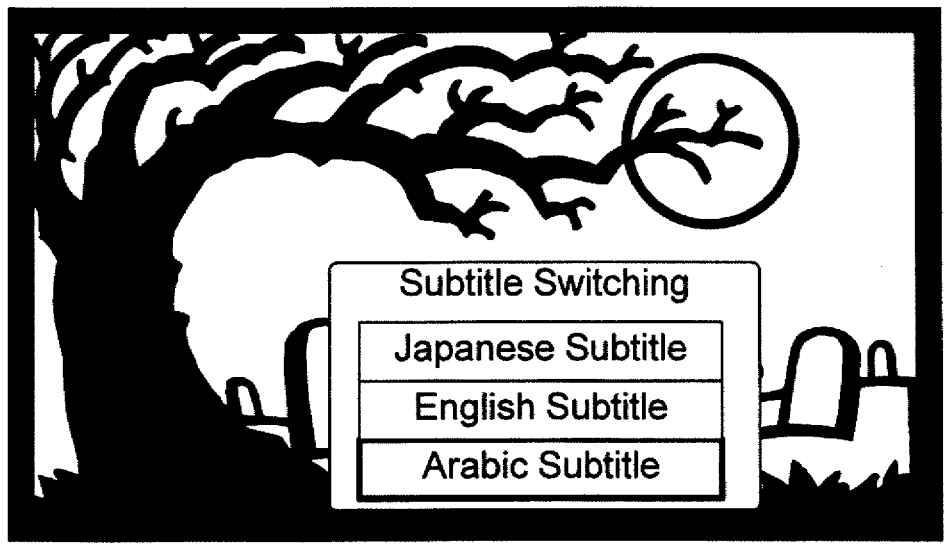
FIG. 16 shows an example of a subtitle switching screen.

If constructing the subtitle switching screen is instructed by the user interface unit 200, the subtitle switching application unit 800 obtains a list of displayable subtitles, specified by the choice specifying unit 500, from the choice specifying unit 500. Then the subtitle switching application unit 800 generates a list item component, which is a display component which can be focused in with respect to each of the displayable subtitles, relates a list item component to a subtitle on a one-to-one basis, and generates a list component constituted by all the list item components. The subtitle switching application unit 800 constructs the subtitle switching screen including the list component, setting one of the list item components included in the list component to the focused state, and the rest of the list item components to the unfocused state. The subtitle switching application unit 800 constructs the subtitle switching screen so that each of all the list item components, included in the list components, can be selected by moving the focus using the cursor up button or cursor down button of the remote controller 20. In concrete terms, for each list item component, the list item component at the focus shift destination using the cursor up button of the remote controller 20, and the list item component at the focus shift destination using the cursor down button of the remote controller 20, is associated. The subtitle switching application unit 800 transfers the data on the constructed subtitle switching screen to the user interface unit 200, and instructs the user interface unit 200 to output the subtitle switching screen to the monitor 30. The subtitle switching screen shown in FIG. 16 is displayed on the monitor 30.

When the instruction to shift focus is received from the user interface unit 200, the subtitle switching application unit 800 sets the list item component at the focus shift destination associated with the list item component, that is currently in the focused state on the subtitle switching screen, to the focused state, and sets the list item component, which has previously been in the focused state, to the unfocused state. When the subtitle switching instruction is received from the user interface unit 200 by pressing the decision button on the remote controller 20, the subtitle switching application unit 800 instructs the subtitle processing unit 300 to display the subtitle, specified based on the focused state on the subtitle switching screen, on the monitor 30. If the information required for obtaining the character expansion application is associated with the switching target subtitle, then the subtitle switching application unit 800 transfers the information required for obtaining the character expansion application to the application processing unit 900. Then the subtitle switching application unit 800 instructs the application processing unit 900 to obtain the character expansion application from the data broadcasting and execute the application.

The subtitle switching application unit 800 transfers the information on the character encoding method and language codes, which the subtitle processing unit 300 is enabled to process by the execution of the character expansion application, to the support possibility determination unit 600, and instructs the support possibility determination unit 600 to update the character support information. Details on the subtitle switching processing by the subtitle switching application unit 800 will be described later.

The subtitle switching application unit 800 constitutes the "controlling unit" in the present invention.

<Application Processing Unit 900>

When an instruction to obtain and execute the character expansion application is received from the subtitle switching application unit 800, the application processing unit 900 obtains information required for obtaining the character expansion application from the subtitle switching application unit 800. Based on this information, the application processing unit 900 obtains a component to transfer the resource of the character expansion application from the multiplexed data received by the broadcasting receiving unit 100, and executes the character expansion application.

The application processing unit 900 constitutes the "application processing unit" in the present invention.

<Choice Specifying Processing Flow>

Figure 2:
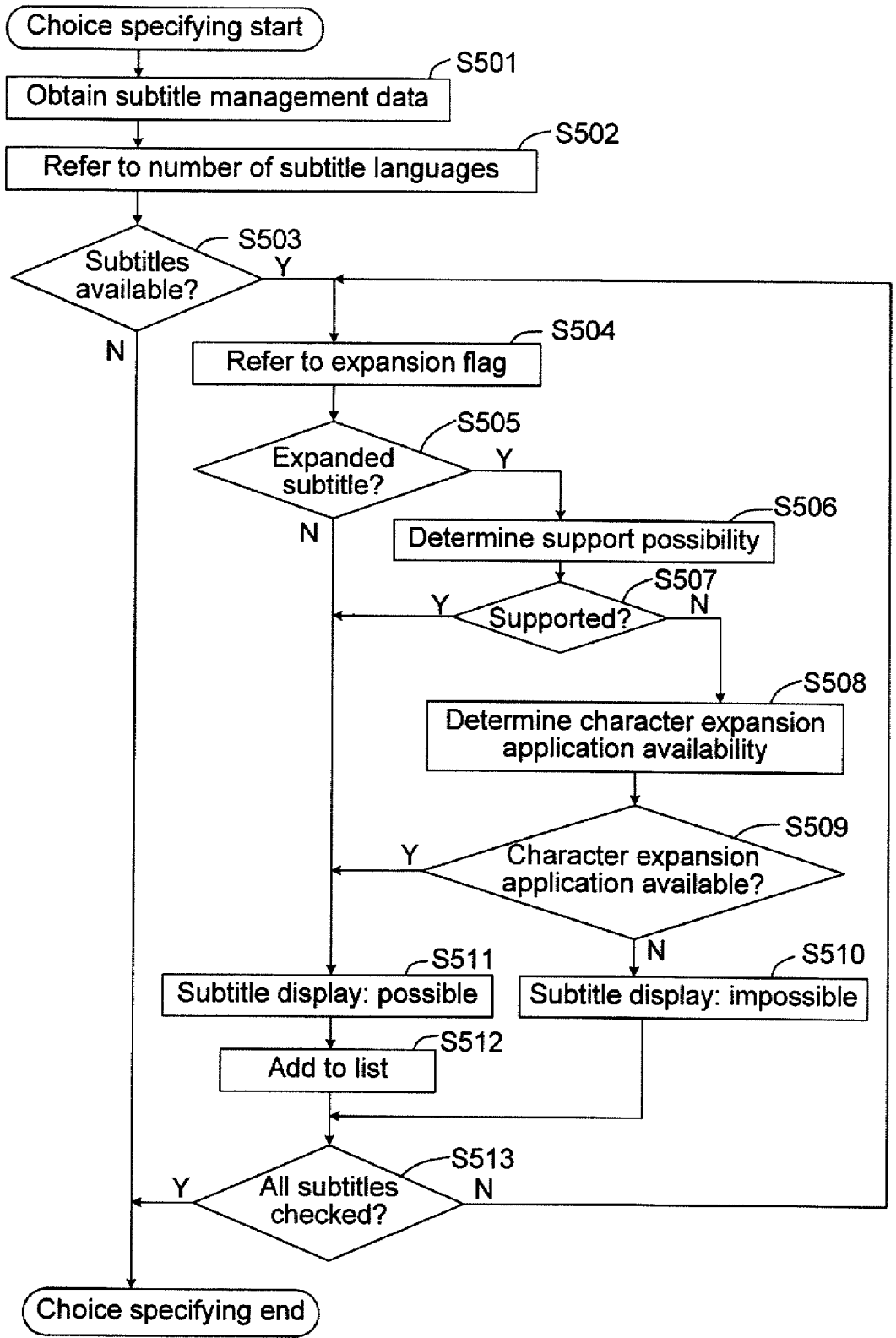
FIG. 2 is a flow chart depicting a processing by a choice specifying unit of Embodiment 1.

Processing for the choice specifying unit 500 to specify displayable subtitles will be described. FIG. 2 shows a flow chart depicting the processing executed by the choice specifying unit 500.

When the program selection notice is received from the broadcasting receiving unit 100, the choice specifying unit 500 obtains the subtitle management data on the subtitle component constituting the selected program from the subtitle processing unit 300 (S501). Then the choice specifying unit 500 refers to the information on the number of subtitle languages stored in the subtitle management data (S502). If the number of subtitle languages is 0 (N in S503), the choice specifying unit 500 ends processing. If the number of subtitle languages is not 0 (Y in S503), then the choice specifying unit 500 starts processing to determine whether the determination target subtitle, that is the subtitle of the first language included in the subtitle component, is a displayable subtitle or not. First the choice specifying unit 500 refers to the subtitle management data (S504), and determines whether the expansion flag of the determination target subtitle is ON or not (S505).

If the expansion flag of the determination target subtitle is OFF (N in S505), the choice specifying unit 500 determines that the determination target subtitle is the standard subtitle, and the determination target subtitle is the displayable subtitle (S511), and adds the determination target subtitle to the list of displayable subtitles (S512). The determination target subtitle whose expansion flag is OFF (N in S505) is the standard subtitle, so the support possibility determination unit 600 determines "decoding possible", although this is not included in the flow chart. If the expansion flag of the determination target subtitle is ON (Y in S505), the choice specifying unit 500 determines that the determination target subtitle is the expanded subtitle. Then the choice specifying unit 500 transfers the information on the character encoding method and language codes of the subtitle text data of the determination target subtitle to the support possibility determination unit 600, and instructs the support possibility determination unit 600 to determine whether the subtitle processing unit 300 can decode the subtitle text data of the determination target subtitle (S506). Details on the determination processing by the support possibility determination unit 600 will be described later.

The choice specifying unit 500 obtains the determination result from the support possibility determination unit 600.

If the obtained determination result is that the subtitle processing unit 300 can decode the subtitle text data of the determination target subtitle (Y in S507), the choice specifying unit 500 determines that the determination target subtitle is a displayable subtitle (S511), and adds the determination target subtitle to the list of the displayable subtitles (S512).

If the obtained determination result is that the subtitle processing unit 300 cannot decode the subtitle text data of the determination target subtitle (N in S507), then the choice specifying unit 500 transfers the information on the character encoding method and language codes of the subtitle text data of the determination target subtitle to the character expansion application availability determination unit 700. Then the choice specifying unit 500 instructs the character expansion application availability determination unit 700 to determine whether the character expansion application, to enable the subtitle processing unit 300 to process the character encoding method and language codes, is provided by the data broadcasting (S508). If the character expansion application is provided by the data broadcasting, the choice specifying unit 500 instructs the character expansion application availability determination unit 700 to obtain information required for obtaining the character expansion application from the data broadcasting. Details on the determination processing by the character expansion application availability determination unit 700 will be described later.

The choice specifying unit 500 obtains the determination result from the character expansion application availability determination unit 700.

If the obtained determination result is that the character expansion application required for decoding the subtitle text data of the determination target subtitle is provided by the data broadcasting (Y in S509), the choice specifying unit 500 determines that the determination target subtitle is a displayable subtitle (S511). Then the choice specifying unit 500 adds the determination target subtitle to the list of the displayable subtitles (S512). Further, the choice specifying unit 500 obtains information, required for obtaining the character expansion application from the data broadcasting, from the character expansion application availability determination unit 700, and stores this information in association with the determination target subtitle, and ends processing.

On the other hand, if the obtained determination result is that the character expansion application, required for decoding the subtitle text data of the determination target subtitle, is not provided by the data broadcasting (N in S509), the choice specifying unit 500 determines that the determination target subtitle cannot be displayed (S510). In this case, the determination target subtitle is not included in the list of displayable subtitles.

The choice specifying unit 500 also executes the above described processing for the subtitles of the second or later languages included in the subtitle component, and if the determination processing ends for all the subtitles for a number of subtitle languages obtained in step S502 (Y in S513), processing of this flow chart ends. If a plurality of subtitle components constitutes the program, the choice specifying unit 500 performs the above processing for all the subtitle components, and integrates the specified displayable subtitles into one list of displayable subtitles, and holds the list. In the following description, a displayable subtitle list refers to a list in which the determination results of all the subtitle components are integrated, unless otherwise specified.

Table 1 shows an example of a displayable subtitle list in which the determination results are integrated.

TABLE 1

| | Expansion flag | Support possibility determination | Character expansion application availability determination |
|---|---|---|---|
| Japanese | OFF | Decoding possible | — |
| English | OFF | Decoding possible | — |
| Hangul (8-unit code) | ON | Decoding possible | — |
| Arabic (8-unit code) | ON | Decoding impossible | YES |

<Support Possibility Determination Processing Flow>

Figure 3:
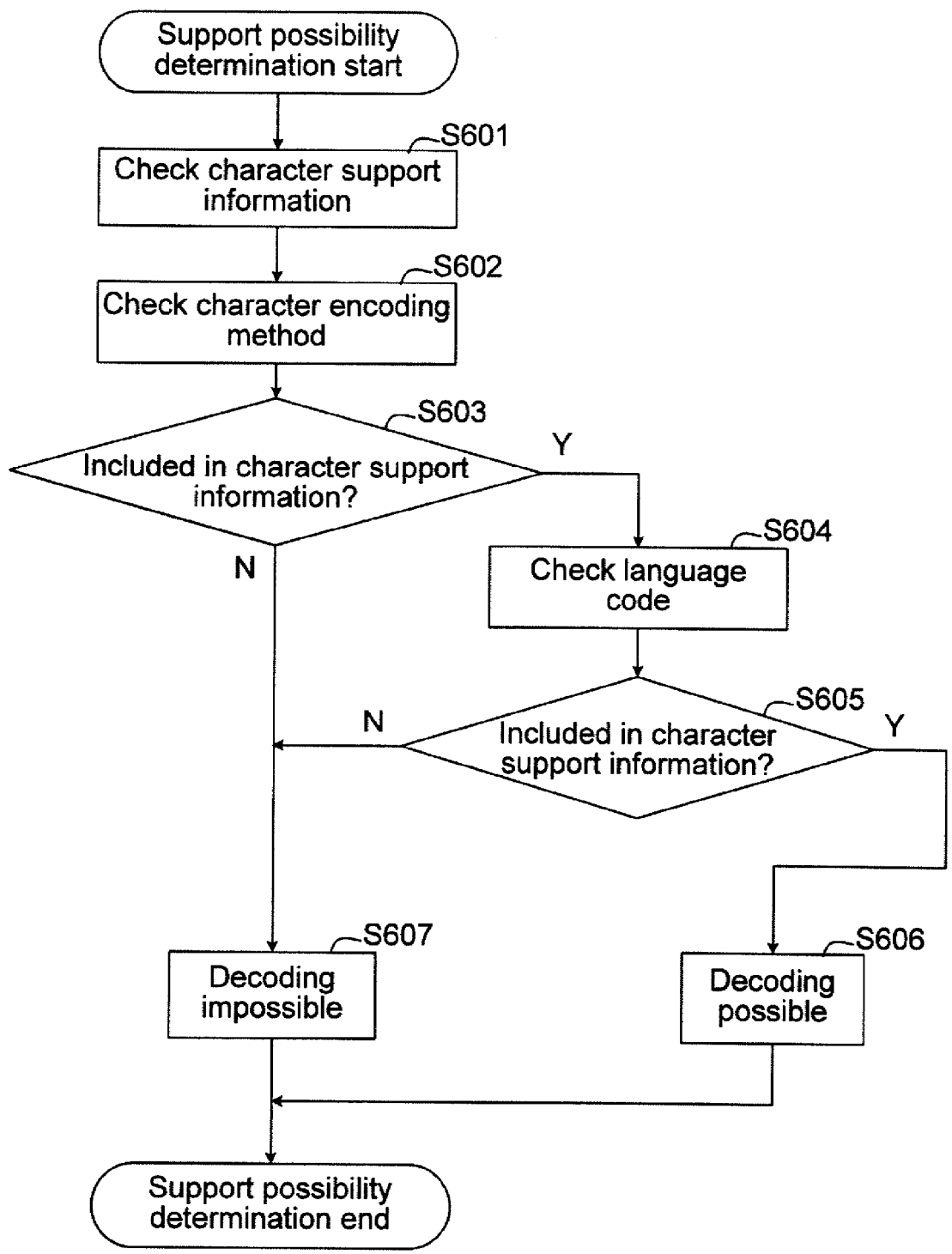
FIG. 3 is a flow chart depicting a processing by a support possibility determination unit of Embodiment 1.

Processing for the support possibility determination unit 600 to determine whether the subtitle processing unit 300 can decode the subtitle text data of the determination target subtitle will be described. FIG. 3 shows a flow chart depicting the processing executed by the support possibility determination unit 600.

When the instruction to determine whether the subtitle processing unit 300 can decode the subtitle text data of the determination target subtitle is received from the choice specifying unit 500, the support possibility determination unit 600 refers to the character support information held by the support possibility determination unit 600 (S601). Then the support possibility determination unit 600 obtains the subtitle management data from the choice specifying unit 500, and specifies the character encoding method of the subtitle text data of the determination target subtitle based on the subtitle management data (S602). Then the support possibility determination unit 600 determines whether the character encoding method of the subtitle text data of the determination target subtitle is included in the character support information (S603).

If the character encoding method of the subtitle text data of the determination target subtitle is not included in the character support information (N in S603), the support possibility determination unit 600 determines that the subtitle processing unit 300 cannot decode the subtitle text data of the determination target subtitle (S607), and ends processing.

On the other hand, if the character encoding method of the subtitle text data of the determination target subtitle is included in the character support information (Y in S603), the support possibility determination unit 600 specifies the language code of the subtitle text data of the determination target subtitle based on the subtitle management data (S604). Then the support possibility determination unit 600 determines whether the language code of the subtitle text data of the determination target subtitle is included in the character support information (S605).

If the language code of the subtitle text data of the determination target subtitle is not included in the character support information (N in S605), the support possibility determination unit 600 determines that the subtitle processing unit 300 cannot decode the subtitle text data of the determination target subtitle (S607), and ends processing.

On the other hand, if the language code of the subtitle text data of the determination target subtitle is included in the character support information (Y in S605), the support possibility determination unit 600 determines that the subtitle processing unit 300 can decode the subtitle text data of the determination target subtitle (S606), and ends processing.

FIG. 4 shows an example of the subtitle management data, the character support information and the determination result by the support possibility determination unit 600. In FIG. 4, only the subtitles whose expansion flag is ON (expanded subtitles) are shown, and the subtitles whose expansion flag is OFF (standard subtitles) are omitted. For the subtitles whose expansion flag is OFF, the determination result by the support possibility determination unit 600 is always "decoding possible". For the subtitles whose expansion flag is ON, the determination result by the support possibility determination unit 600 is "decoding possible", if both the character encoding method and language code of the subtitle text data are included in the character support information, otherwise the determination result is "decoding impossible".

In the example shown in FIG. 4, "8-unit code" is listed as the character encoding method, and "Hangul" is listed as the language code, which can be processed by the subtitle processing unit 300 respectively, in the character support information. The character encoding method "UCS" and the language code "Arabic" are not included in the character support information. Therefore, out of the subtitles whose expansion flag is ON, only the subtitles whose character encoding method is "8-unit code" and language code is "Hangul" is "decoding possible" in the determination result by the support possibility determination unit 600.

For the subtitles whose subtitle text data is encoded using at least the character encoding method "UCS" or the language code "Arabic", the determination result by the support possibility determination unit 600 is "decoding impossible". If the application processing unit 900 obtains and executes the character expansion application for enabling processing of the character encoding method "UCS" or the character expansion application for enabling processing the language code "Arabic", then "UCS" or "Arabic" is added to the character support information.

<Character Expansion Application Availability Determination Flow>

Figure 5:
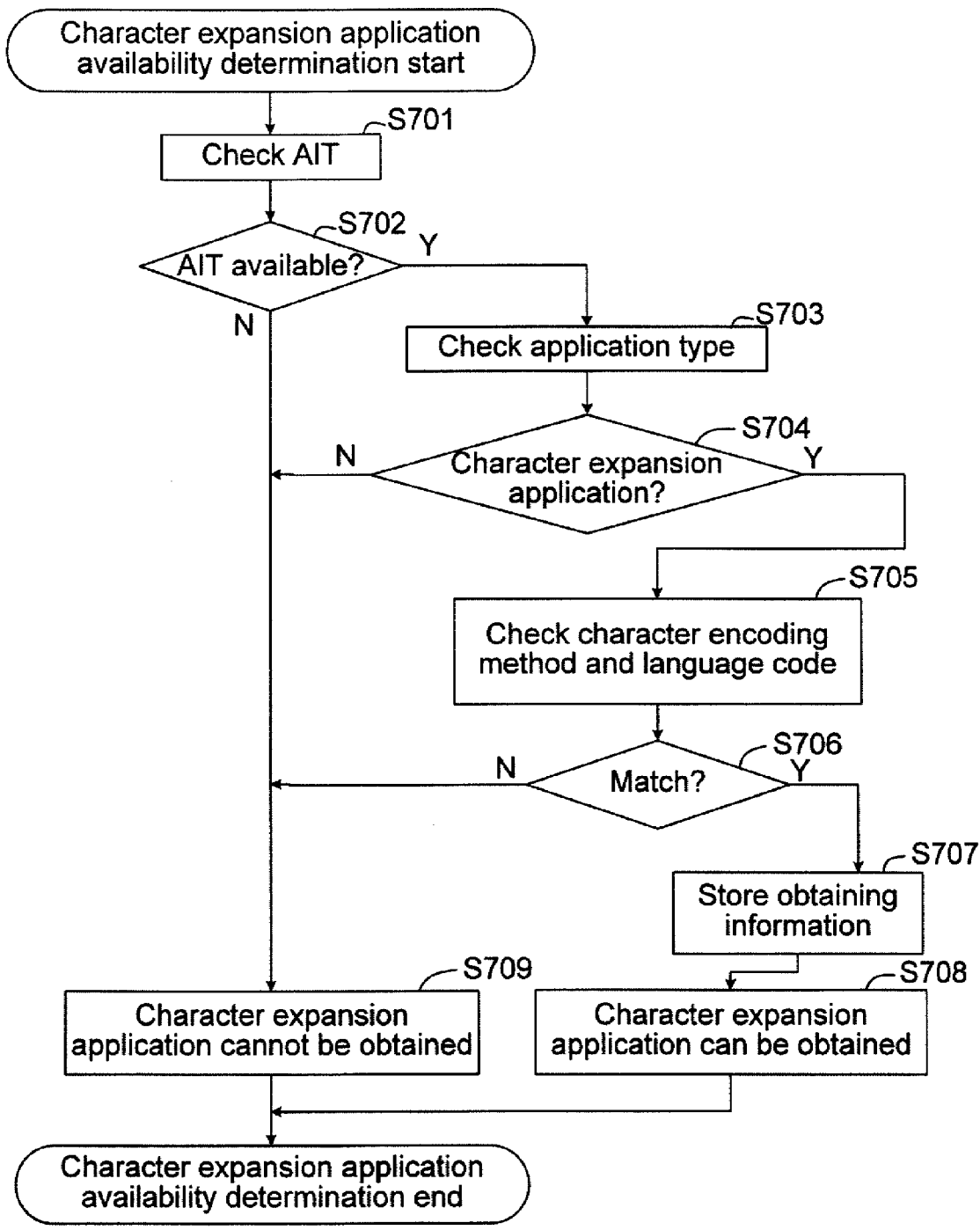
FIG. 5 is a flow chart depicting a processing by a character expansion application availability determination unit in Embodiment 1.

Processing for the character expansion application availability determination unit 700 to determine the availability of the character expansion application will be described. FIG. 5 shows the flow chart depicting the processing executed by the character expansion application availability determination unit 700.

When an instruction, to determine whether the character expansion application required for decoding the subtitle text data of the determination target subtitle is provided by the data broadcasting, is received from the choice specifying unit 500, the character expansion application availability determination unit 700 obtains the AIT from the PSI/SI management unit 400 (S701).

If the AIT cannot be obtained (N in S702), the character expansion application availability determination unit 700 determines that the character expansion application required for decoding the subtitle text data of the determination target subtitle is not provided by the data broadcasting (S709), and ends the determination processing.

On the other hand, if the AIT can be obtained (Y in S702), the character expansion application availability determination unit 700 refers to the descriptor for describing the individual application information of the AIT, and refers to the application type of the application listed in the AIT (S703). The application type is information to indicate a category of the application, such as "game", "character expansion", "user history collection" or the like. It is assumed that the application type of the character expansion application is a "character expansion". The character expansion application availability determination unit 700 determines whether an application whose application type is "character expansion" is included in the applications listed in the AIT (S704).

If an application whose application type is "character expansion" is not included (N in S704), the character expansion application availability determination unit 700 determines that the character expansion application required for decoding the subtitle text data of the determination target subtitle is not provided by the data broadcasting (S709), and ends the determination processing.

On the other hand, if an application whose application type is "character expansion" is included (Y in S704), then the character expansion application availability determination unit 700 advances to step S705. In step S705, the character expansion application availability determination unit 700 obtains the information on the character encoding method and language codes, subtitle processing unit 300 processing of which is enabled by executing the character expansion application listed in the AIT. The character expansion application availability determination unit 700 obtains this information by referring to the descriptor for describing the individual application information of the AIT.

The character expansion application availability determination unit 700 determines whether the character expansion application, which enables the processing of the character encoding method of the determination target subtitle and the character expansion application which enables the processing of the language codes of the determination target subtitle, are included in the applications listed in the AIT (S706). The character expansion application which enables the processing of the character encoding method of the determination target subtitle and the character expansion application which enables the processing of the language codes of the determination target subtitle may be different applications or a same application. In other words, both processing of the character encoding method and language codes of the determination target subtitle may be enabled by executing one character expansion application, or may be enabled by executing a plurality of character expansion applications.

If it is determined that the character encoding method and language codes, processing of which is enabled by the character expansion application listed in the AIT and the character encoding method and language codes of the determination target subtitle "do not match" (N in S706), the character expansion application availability determination unit 700 advances to step S709. In step S709, the character expansion application availability determination unit 700 determines that the character expansion application required for decoding the subtitle text data of the determination target subtitle cannot be obtained from the data broadcasting, and ends processing.

If it is determined that the character encoding method and language codes, processing of which is enabled by the character expansion application listed in the AIT and the character encoding method and language code of the determination target subtitle "match" (Y in S706), the character expansion application availability determination unit 700 advances to step S707. In step S707, the character expansion application availability determination unit 700 obtains information required for obtaining the corresponding character expansion application. The character expansion application availability determination unit 700 analyzes the AIT, PMT, EIT or the like which are obtained from the PSI/SI management unit 400, and obtains the information required for obtaining the character expansion application. Then the character expansion application availability determination unit 700 determines that the character expansion application, to enable the subtitle processing unit 300 to process the character encoding method and language codes of the subtitle text data of the determination target subtitle, can be obtained from the data broadcasting (S708), and ends processing.

Figure 6:
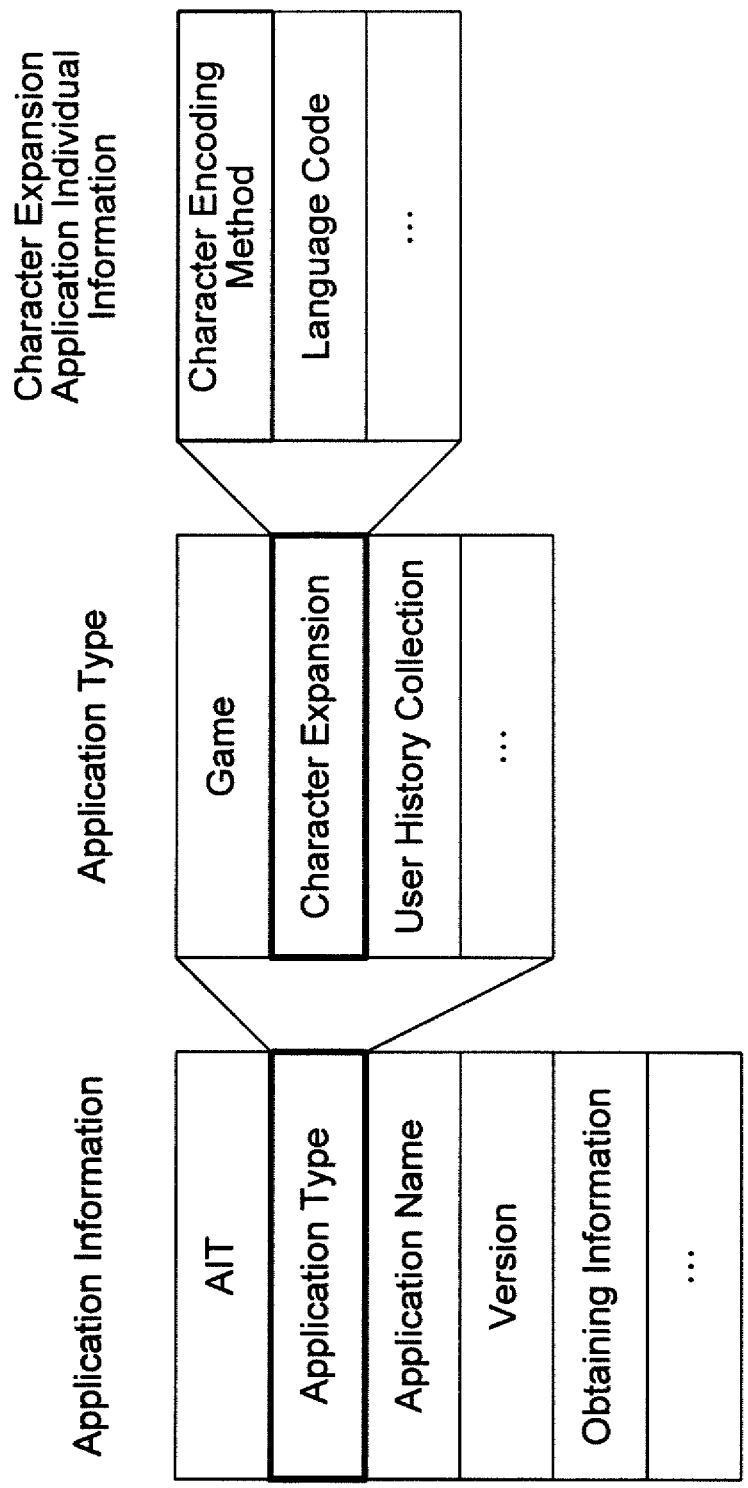
FIG. 6 shows an example of the content of AIT.

FIG. 6 shows an example of the application information written in the AIT. As FIG. 6 shows, the AIT stores a list of all the applications provided by the data broadcasting, common information of each application, and individual information of each application (application name, version, application type). As FIG. 6 shows, in the individual information of the application whose application type is "character expansion", information on the character encoding method and language codes, which the subtitle processing unit 300 is enabled to process by the execution of this application, is stored.

<Subtitle Switching Processing Flow>

Figure 7:
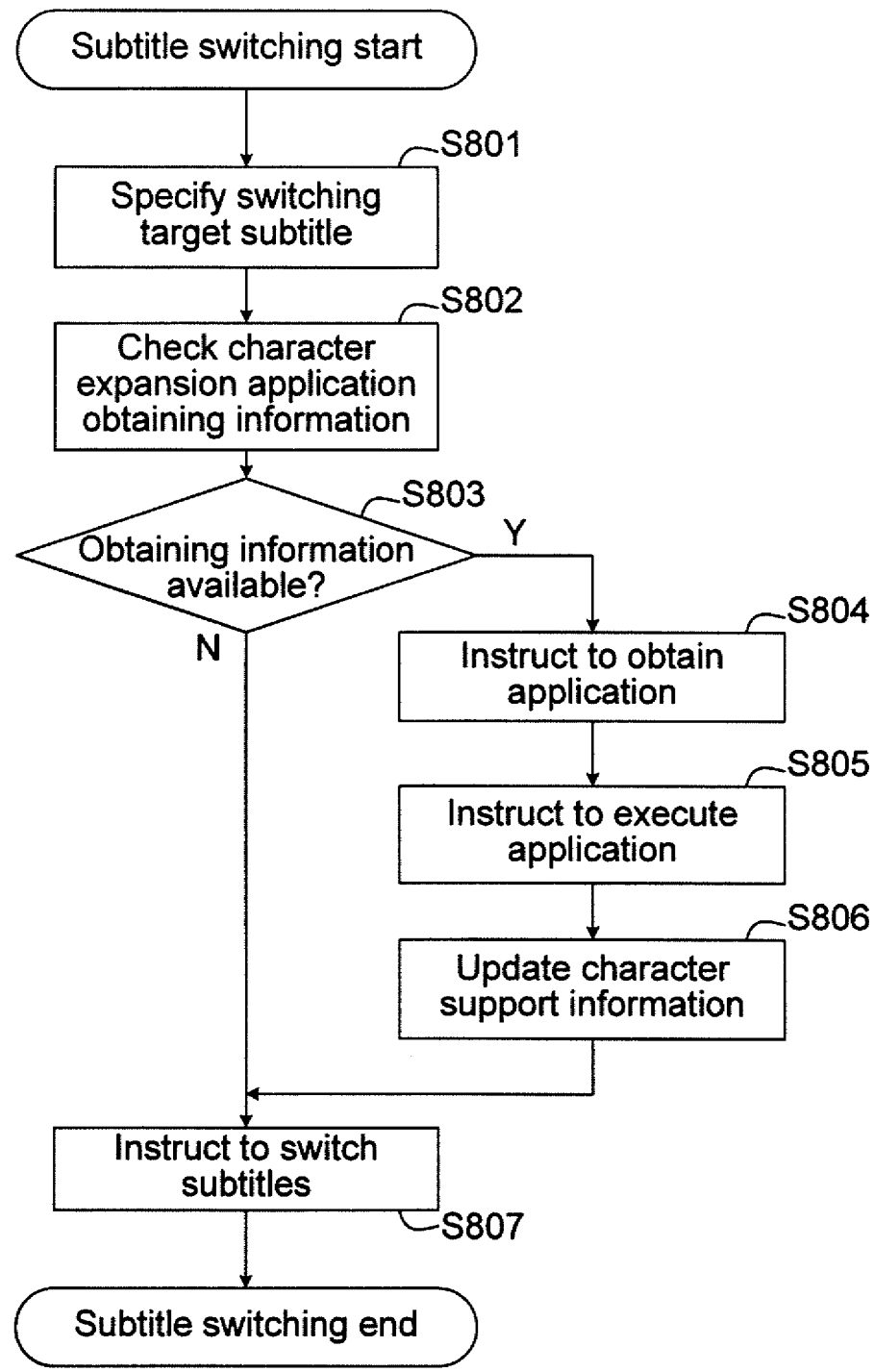
FIG. 7 is a flow chart depicting a processing by a subtitle switching application unit in Embodiment 1.

Processing for the subtitle switching application unit 800, to switch the subtitle according to the subtitle switching instruction from the user interface unit 200, will be described. FIG. 7 shows a flow chart depicting the processing executed by the subtitle switching application unit 800.

When the instruction to construct the subtitle switching screen is received from the user interface unit 200, the subtitle switching application unit 800 obtains the list of displayable subtitles from the choice specifying unit 500, and constructs the subtitle switching screen to present the subtitles included in the list as choices of switchable subtitles. The subtitle switching application unit 800 transfers the data on the constructed subtitle switching screen to the user interface unit 200, and instructs the user interface unit 200 to output this subtitle switching screen to the monitor 30. FIG. 16 shows an example of the subtitle switching screen. In the example of FIG. 16, Japanese, English and Arabic are presented as choices of switchable subtitles. The subtitles presented in the example of the subtitle switching screen in FIG. 16 are not related to the character support information shown as an example in FIG. 4.

When the instruction to execute the switching processing to the subtitle selected by the user by pressing the decision button of the remote controller 20, is received from the user interface unit 200, the subtitle switching application unit 800 specifies a subtitle which is in the focused state in the subtitle switching screen as a switching target subtitle (S801).

The subtitle switching application unit 800 obtains from the choice specifying unit 500 the information required for obtaining the character expansion application, which is stored in association with the displayable subtitles, from the data broadcasting (S802). Then the subtitle switching application unit 800 determines whether information for obtaining the character expansion application from the data broadcasting is stored in association with the switching target subtitle specified in step S801 (S803).

If the information for obtaining the character expansion application is not associated with the switching target subtitle (N in S803), the subtitle switching application unit 800 determines that the switching target subtitle is a standard subtitle or an expanded subtitle whose character encoding method and language codes are listed in the character support information. Then the subtitle switching application unit 800 instructs the subtitle processing unit 300 to display the switching target subtitle (S807), and ends processing.

On the other hand, if the information for obtaining the character expansion application is associated with the switching target subtitle (Y in S803), the subtitle switching application unit 800 transfers this information to the application processing unit 900, and instructs the application processing unit 900 to obtain this character expansion application (S804). Then the subtitle switching application unit 800 instructs the application processing unit 900 to execute the character expansion application obtained from data broadcasting (S805). By the application processing unit 900 executing the character expansion application, the subtitle processing unit 300 is enabled to process the character encoding method and language codes of the subtitle text data of the switching target subtitle.

The subtitle switching application unit 800 instructs the support possibility determination unit 600 to add the information on the character encoding method and language codes, the subtitle processing unit 300 processing of which is enabled by the application processing unit 900 executing the character expansion application, to the character support information (S806). Thereby the character support information held by the support possibility determination unit 600 is updated. Then the subtitle switching application unit 800 instructs the subtitle processing unit 300 to display the switching target subtitle (S807), and ends processing. As described above, if the character expansion application is executed once, the function of the subtitle processing unit 300 is expanded so that the expanded subtitle corresponding to the executed character expansion application can be decoded. Thereafter if the user instructs to display the same expanded subtitle again, subtitle processing unit 300 can decode the expanded subtitle without executing the same character expansion application again.

According to the digital broadcasting receiving apparatus 1 of the present embodiment, if standard subtitles and expanded subtitles are provided for a selected program, both the standard subtitles and displayable expanded subtitles are presented as choices on the subtitle switching screen, which is displayed by pressing the "Subtitle" button. Therefore by simply pressing the "Subtitle" button, which has been performed as a general operation, the user can select a desired subtitle from the standard subtitles and displayable expanded subtitles, which are provided for the program, and use the selected subtitle. As a result, the user can use both the standard subtitling service and expanded subtitling service by a common operation, without concern for the difference of modes of providing a respective subtitling service, which increases user convenience.

(Variant Form)

As the interface for presenting a user with the choices of the switchable subtitles specified out of the standard subtitles and the expanded subtitles, and enabling a user to select a desired subtitle out of these choices, the following is possible in addition to the one described in the present embodiment.

A possible example is an interface in which the subtitle switching screen is displayed by user pressing the "Subtitle" button, and while the subtitle switching screen is being displayed, the subtitle to be selected is sequentially switched each time the user presses the "Subtitle" button. In the case of the subtitle switching screen example in FIG. 16, if the user presses the "Subtitle" button while watching a program, the subtitle switching screen shown in FIG. 16 is displayed. At this time, the subtitle switching screen is displayed in the state of a certain subtitle (Arabic subtitle in the example of FIG. 16), out of the choices being selected (focused in). The subtitle being selected by default, when the subtitle switching screen is displayed, is determined, for example, as the subtitle whose subtitle identification value is greatest next to that of the currently selected subtitle, among the subtitles included in the choices. The subtitle identification value can be any value if all the subtitles provided for a program can be uniquely identified respectively, and a component tag value of the subtitle component, for example, can be used if such operation is performed as 1ES is allocated for each subtitle language.

If the "Subtitle" button is pressed again while the subtitle switching screen is being displayed, the subtitle switching screen is shifted to the state where the next subtitle of the currently selected subtitle is selected. The "next subtitle" to be determined can be, for example, a subtitle whose subtitle identification value is greatest next to that of the currently selected subtitle. Or a subtitle which is displayed in a next position below the currently selected subtitle on the subtitle switching screen may be determined. In the case of FIG. 16, there is no choice below the Arabic subtitle, so the Japanese subtitle which is positioned at the top is the "Next subtitle" to the Arabic subtitle. If the "Subtitle" button is not operated for a predetermined time, or if another button is operated in a state of a subtitle being selected on the subtitle switching screen, the subtitle switching screen may be cleared and returned to the state before pressing the "Subtitle" button.

If such an interface is used, the user can select a desired subtitle, out of the standard subtitles and displayable expanded subtitles, which are provided for the program, by a simple operation using only the "Subtitle" button.

The user interface is not limited to the two examples mentioned above, but can be any user interface if the standard subtitles and displayable expanded subtitles, which are provided for the program, can be presented to the user as choices of switchable subtitles, and the user can select a desired subtitle out of the presented choices. For example, in the case of the above two examples, the choices of switchable subtitles are displayed on the monitor 30 as the subtitle switching screen, but if an information display screen, such as a liquid crystal screen, is provided in a digital. TV main unit, recorder main unit or remote controller 20, the choices may be displayed on this information display screen.

(Embodiment 2)

Figure 8:
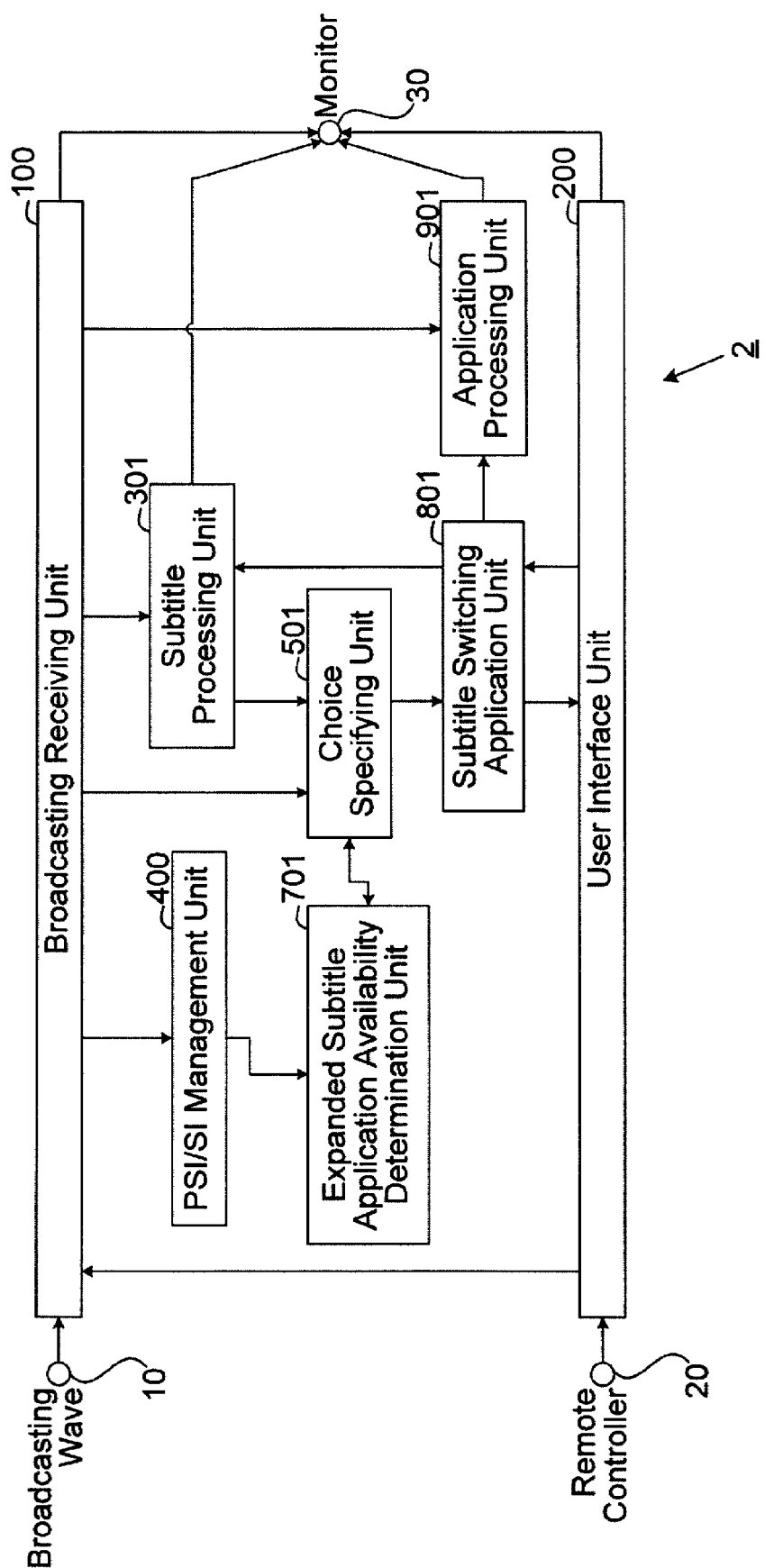
FIG. 8 is a functional block diagram of a digital broadcasting receiving apparatus of Embodiment 2.

A second embodiment of the present invention will now be described. FIG. 8 is a functional block diagram depicting a digital broadcasting receiving apparatus 2 according to this embodiment. In FIG. 8, a composing element equivalent to the composing element of the digital broadcasting receiving apparatus 1 of Embodiment 1 shown in FIG. 1 is denoted with the same symbol and name as FIG. 1 for which detailed description is omitted. For a composing element which has a different symbol but a same name as Embodiment 1, the function is equivalent to Embodiment 1 unless otherwise specified.

In the present embodiment, the difference from Embodiment 1 is a mode of providing the expanded subtitling service. In Embodiment 1, each expanded subtitle is transmitted as a subtitle component comprised of subtitle management data and subtitle text data, just like the standard subtitle, and is distinguished from the standard subtitle by an expansion flag in the subtitle management data. In this embodiment, each expanded subtitle is provided as an application. Therefore only the information on the standard subtitles is stored in the subtitle management data, and information on the expanded subtitles is stored in the AIT (Application Information Table).

The expanded subtitle application has the subtitle text data of an expanded subtitle, and has such functions as transmitting such control information as the timing to present the subtitle and display mode, decoding the subtitle text data, superimposing the subtitle onto an image, and outputting the data to the monitor 30, and is provided as an expanded subtitle application, which is different depending on the respective subtitle language. This aspect is different from Embodiment 1, where the character expansion application has a function to expand the character encoding method and language codes that the subtitle processing unit 300 can process, and the subtitle processing unit 300 has the function to decode the subtitle text data of the expanded subtitle and output the data to the monitor 30.

In the present embodiment, the expanded subtitles are displayed by the function of the expanded subtitle application alone. A subtitle processing unit 301 only decodes the subtitle text data of the standard subtitles, and outputs the data to the monitor 30, and is not involved in the output of expanded subtitles to the monitor 30. And just like Embodiment 1, the subtitle processing unit 301 can decode the subtitle text data of the standard subtitles, as a standard function of the digital broadcasting receiving apparatus 2. Therefore in the present embodiment, it is unnecessary to determine whether the character encoding method and language codes of the subtitle text data are included in the character support information, and the composing element that corresponds to the support possibility determination unit 600 in Embodiment 1 does not exist.

In the present embodiment, the subtitle processing unit 301 constitutes the "subtitle processing unit" in the present invention.

<Choice Specifying Unit 501>

A choice specifying unit 501 specifies the displayable subtitles among the subtitles provided for the program, and transfers the information of the specified displayable subtitles to the subtitle switching application unit 800. The choice specifying unit 501 specifies a list of the displayable subtitles based on the subtitle management data obtained from the subtitle processing unit 301 and the result of the determination processing (described later) by an expanded subtitle application availability determination unit 701.

In the present embodiment, the choice specifying unit 501 constitutes the "specifying unit" in the present invention.

As mentioned above, in the present embodiment, only standard subtitles are managed by the subtitle management data, and since the standard subtitles can be decoded by a standard function of the digital broadcasting receiving apparatus 2, the subtitles managed by the subtitle management data are all displayable subtitles. The stand-alone expanded subtitle application has a function to display the expanded subtitles, so the expanded subtitles supported by the expanded subtitle application, which can be obtained from the data broadcasting, are all displayable subtitles. Therefore the choice specifying unit 501 specifies all the subtitles managed by the subtitle management data and all the expanded subtitles supported by the expanded subtitle applications listed in the AIT, as displayable subtitles. Details on the processing for the choice specifying unit 501 to specify displayable subtitles will be described later.

The choice specifying unit 501 obtains, from an expanded subtitle application availability determination unit 701, information required for obtaining the expanded subtitle application from data broadcasting, associates this information with information on displayable subtitles, and transfers it to a subtitle switching application unit 801.

<Expanded Subtitle Application Availability Determination Unit 701>

The expanded subtitle application availability determination unit 701 determines whether the expanded subtitle application is provided by data broadcasting accompanying the program, based on the AIT obtained from the PSI/SI management unit 400. If the expanded subtitle application is provided by data broadcasting, the expanded subtitle application availability determination unit 701 obtains information required for obtaining the expanded subtitle application from data broadcasting, and transfers this information to the choice specifying unit 501. Details on the determination processing by the expanded subtitle application availability determination unit 701 will be described later.

<Subtitle Switching Application Unit 801>

When the subtitle switching instruction is received from the user interface unit 200, the subtitle switching application unit 801 instructs the subtitle processing unit 301 to display the switching target subtitle on the monitor 30 if the switching target subtitle is a standard subtitle. If the switching target subtitle is an expanded subtitle, on the other hand, the subtitle switching application unit 801 transfers the information required for obtaining the expanded subtitle application corresponding to the switching target expanded subtitle to the application processing unit 901, and instructs the application processing unit 901 to obtain the expanded subtitle application from data broadcasting, and execute it.

In the present embodiment, the subtitle switching application unit 801 constitutes the "controlling unit" in the present invention.

<Application Processing Unit 901>

When the instruction to obtain and execute the expanded subtitle application is received from the subtitle switching application unit 801, an application processing unit 901 obtains information, required for obtaining the expanded subtitle application, from the subtitle switching application unit 801. Based on this information, the application processing unit 901 obtains a component to transmit the resource of the expanded subtitle application from the multiplexed data received by the broadcasting receiving unit 100, and executes the expanded subtitle application.

In the present embodiment, the application processing unit 901 constitutes the "application processing unit" in the present invention.

<Choice Specifying Processing Flow>

Figure 9:
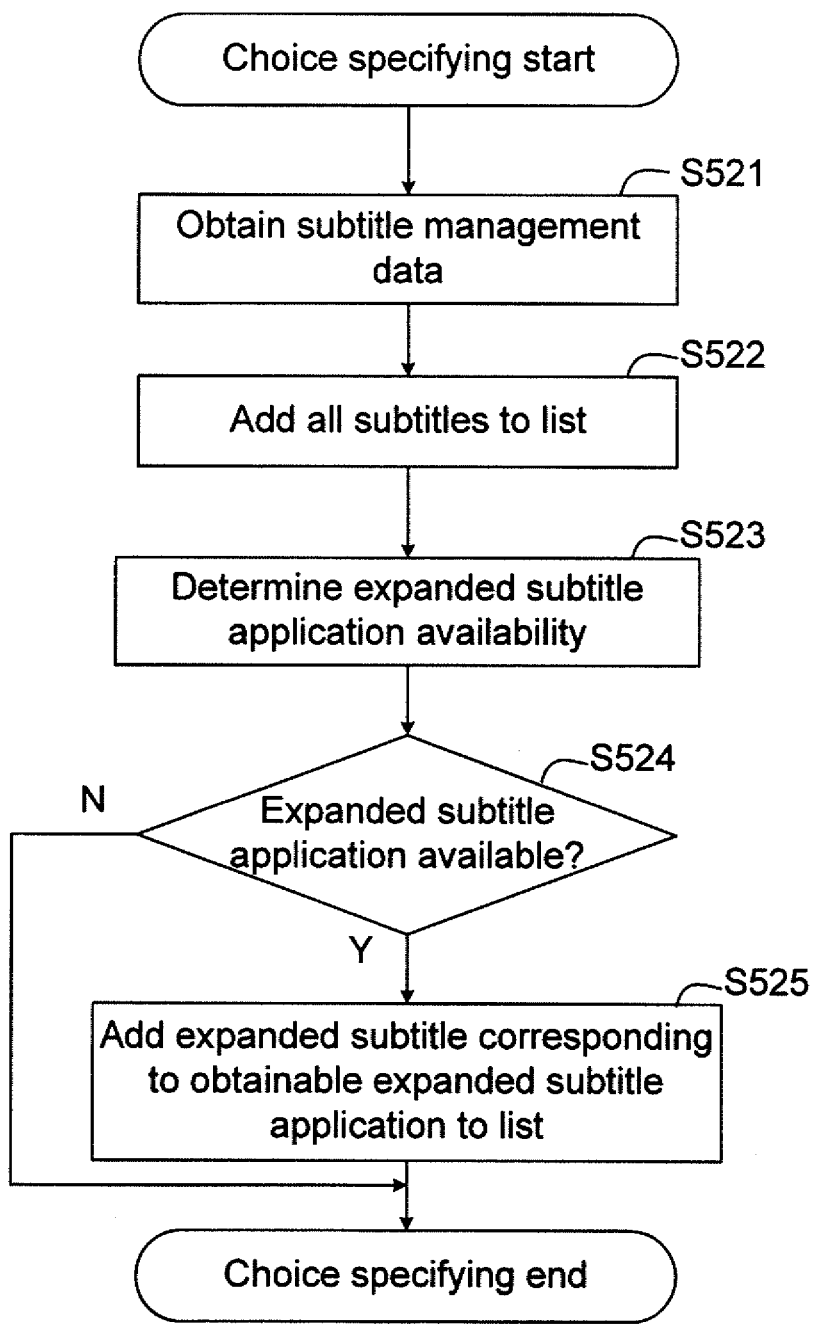
FIG. 9 is a flow chart depicting a processing by a choice specifying unit of Embodiment 2.

Processing for the choice specifying unit 501 to specify displayable subtitles will now be described. FIG. 9 shows a flow chart depicting the processing executed by the choice specifying unit 501.

When a program selection notice is received from the broadcasting receiving unit 100, the choice specifying unit 501 obtains the subtitle management data of the subtitle component constituting the selected program from the subtitle processing unit 301 (S521). Then the choice specifying unit 501 refers to the information on the number of languages stored in the subtitle management data and the language code of each subtitle data, and adds these subtitles to the list of displayable subtitles (S522). If there are pluralities of subtitle components constituting the program, the processing for adding all the subtitles stored in the subtitle management data to the list of the displayable subtitles is performed for all the subtitle components.

Then the choice specifying unit 501 instructs the expanded subtitle application availability determination unit 701 to determine whether the expanded subtitle application is included in the applications provided by the data broadcasting accompanying the program (S523). Details on the determination processing by the expanded subtitle application availability determination unit 701 will be described later.

The choice specifying unit 501 obtains the determination result from the expanded subtitle application availability determination unit 701.

When the determination result, that the expanded subtitle application is provided by the data broadcasting, is received (Y in S524), the choice specifying unit 501 adds the expanded subtitle corresponding to the expanded subtitle application to the list of displayable subtitles (S525). Further, the choice specifying unit 501 obtains the information, required for obtaining this expanded subtitle application from the data broadcasting, from the expanded subtitle application availability determination unit 701, stores this information in association with the expanded subtitle, and ends processing.

On the other hand, if the determination result, that the expanded subtitle application is not provided by the data broadcasting, is received (N in S524), the choice specifying unit 501 ends processing without adding anything to the list of displayable subtitles.

<Expanded Subtitle Application Availability Determination Flow>

Figure 10:
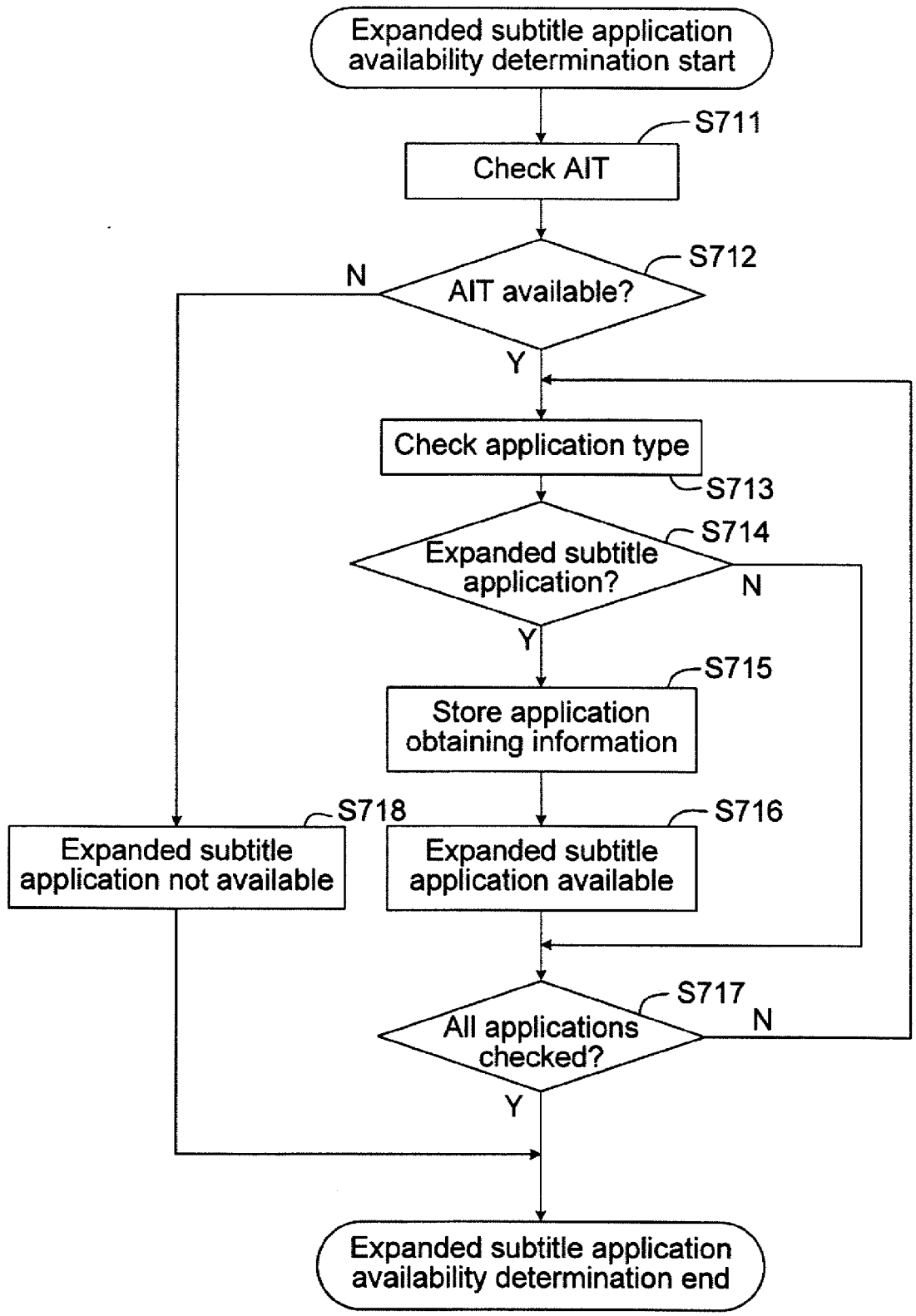
FIG. 10 is a flow chart depicting a processing by an expanded subtitle application availability determination unit of Embodiment 2.

Processing for the expanded subtitle application availability determination unit 701 to determine whether the expanded subtitle application is available will be described. FIG. 10 shows a flow chart depicting the processing executed by the expanded subtitle application availability determination unit 701.

When an instruction, to determine whether the expanded subtitle application is included in the applications provided by the data broadcasting accompanying the program, is received from the choice specifying unit 501, the expanded subtitle application availability determination unit 701 obtains the AIT from the PSI/SI management unit 400 (S711).

If the AIT cannot be obtained (N in S712), the expanded subtitle application availability determination unit 701 determines that the expanded subtitle application is not provided by the data broadcasting (S718), and ends processing.

On the other hand, if the AIT can be obtained (Y in S712), the expanded subtitle application availability determination unit 701 checks the application type of the determination target application, which is an application listed in the AIT (S713). Then the expanded subtitle application availability determination unit 701 determines whether the application type of the determination target application is an "Expanded subtitle" or not (S714). The application type "Expanded subtitle" is an application category into which the expanded subtitle applications are classified.

If the application type of the determination target application is not "Expanded subtitle" (N in S714), then the expanded subtitle application availability determination unit 701 determines whether the application type is checked for all the applications listed in the AIT (S717).

If the application type of the determination target application is "Expanded subtitle" (Y in S714), the expanded subtitle application availability determination unit 701 obtains information required for obtaining the expanded subtitle application from the data broadcasting, and stores the information (S715). Then the expanded subtitle application availability determination unit 701 determines that the expanded subtitle application is provided by the data broadcasting (S716), and executes the processing in step S717 (mentioned above).

If the application type is not yet checked for all the applications (N in S717), the expanded subtitle application availability determination unit 701 executes the above processing in the same manner for the application whose application type is not checked, as the determination target.

On the other hand, if it is determined that the application type is checked for all the applications (Y in S717), then the expanded subtitle application availability determination unit 701 ends processing.

By the processing described above, a list of displayable subtitles is specified. Based on this list of displayable subtitles, the subtitle switching application unit 801 constructs a subtitle switching screen in the same manner as Embodiment 1. Both the standard subtitles and expanded subtitles provided as applications are presented as choices on this subtitle switching screen. Therefore the user can select and use a desired subtitle, out of all the standard subtitles and displayable expanded subtitles provided for the selected program, simply by pressing "Subtitle" button, which is the conventionally used general operation.

If a component tag is used for subtitle identification, as shown in the variant form of Embodiment 1, for the case of the expanded subtitles being provided as applications, like the present embodiment, a component tag of data-carousel for transmitting an expanded subtitle application can be used for subtitle identification.

(Embodiment 3)

Embodiment 3 of the present invention will now be described. The present embodiment is an embodiment in the case of an expanded subtitle being provided as an application, just like Embodiment 2.

In the present embodiment, the method for determining the availability of an expanded subtitle application is different from Embodiment 2. In Embodiment 2, an example of determining the availability of the expanded subtitle application by analyzing the AIT was described, but in the present embodiment, the availability of an expanded subtitle application is determined by analyzing the BML (Broadcast Markup Language) document, which describes the data broadcasting image of the selected program.

FIG. 14 shows an example of a BML document for the initial screen of data broadcasting. The BML document for the initial screen refers to a startup document or a BML document which is specified to a transition destination in the script, which is set to be executed by pressing the "d" button, written in the startup document. The startup document is a BML document which is processed first when a program is selected or during startup. On the data broadcasting screen, which is controlled according to the example of the BML document for the initial screen shown in FIG. 14, the character string "Hangul Subtitle" and an image object "hangul.jpg" are included as the elements for obtaining the expanded subtitle applications of a Hangul subtitle. In the same manner, an element for obtaining an expanded subtitle application of an Arabic subtitle, an element for obtaining a game application, and an element for opening a BML document (weather.bml) stored locally are included. For example, if the user operates the remote controller 20 and selects an element of the Hangul subtitle on the data broadcasting screen, an argument "jimaku_hangul" is transferred to the application startup function launchXlet( ) by the script hangul( ). Thereby "jimaku_hangul", the expanded subtitle application of the Hangul subtitle, is obtained from the data broadcasting, and executed, and as a result, the expanded subtitling service of the Hangul subtitle can be used.

Figure 11:
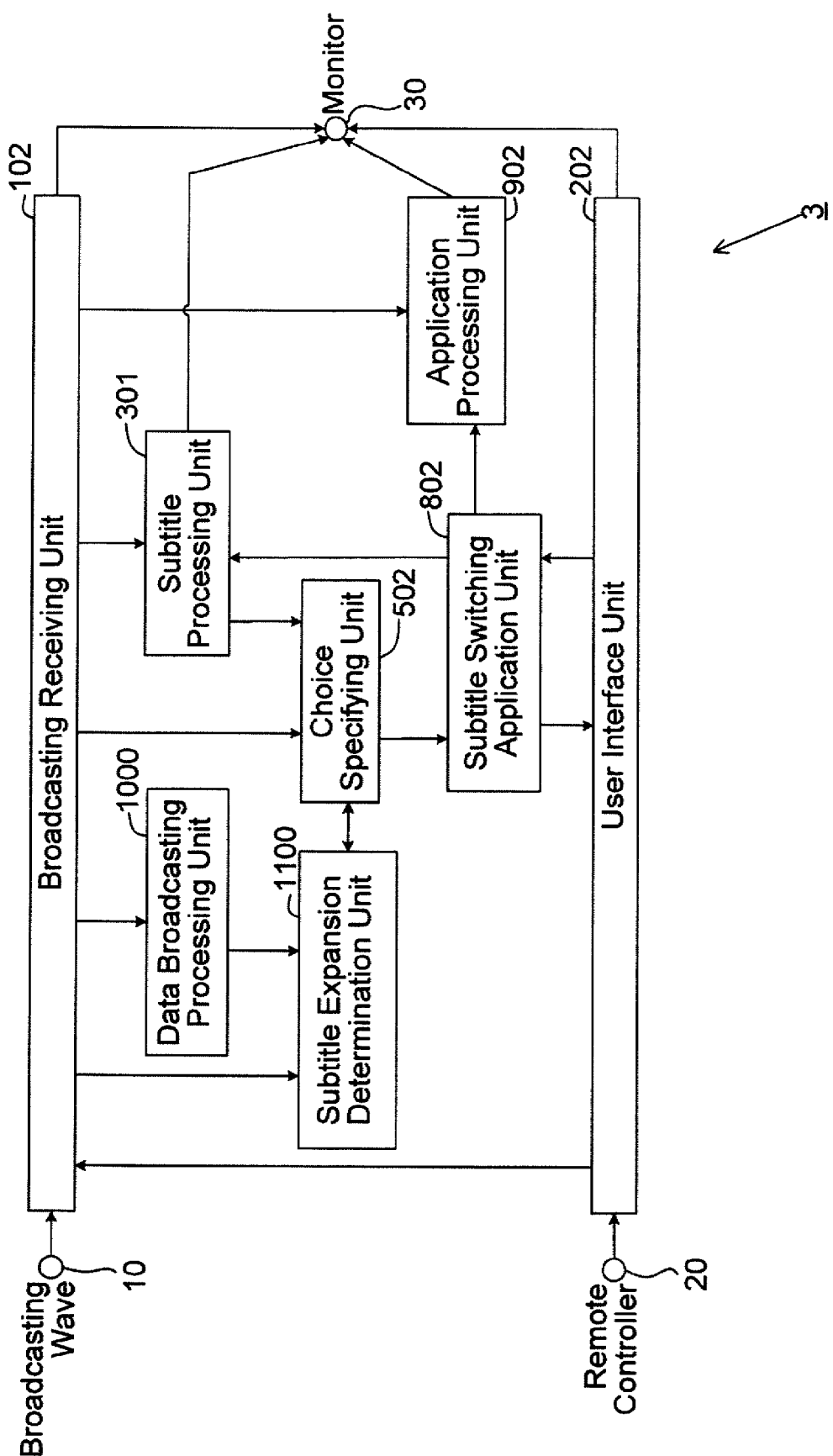
FIG. 11 is a functional block diagram of a digital broadcasting receiving apparatus of Embodiment 3.

FIG. 11 is a functional block diagram of the digital broadcasting receiving apparatus 3 according to the present embodiment. A composing element the same as Embodiment 1 and Embodiment 2 is denoted with the same symbol and name, detailed description for which is omitted. In a composing element which has a different symbol but a same name as Embodiment 1 and Embodiment 2, the function is equivalent to Embodiment 1 and Embodiment 2 unless otherwise specified.

<Broadcasting Receiving Unit 102>

A broadcasting receiving unit 102 extracts the PSI/SI from the demultiplexed data component, and analyzes it in order to obtain the program type of the selected program, and transfers this information to the subtitle expansion determination unit 1100. Here the program type refers to a type of a program based on the data broadcasting service, such as a "normal TV program" (program without additional data), "data added TV program" (program with additional data), and "independent data program" (data program intended to be viewed independently).

In the present embodiment, the broadcasting receiving unit 102 constitutes the "receiving unit" in the present invention.

<Data Broadcasting Processing Unit 1000>

A data broadcasting processing unit 1000 parses the BML document, which is data for the data broadcasting demultiplexed by the broadcasting receiving unit 102, and generates a DOM object, script object and display screen data. If the user instructs to display the data broadcasting screen by pressing the "d" button, the data broadcasting processing unit 1000 outputs display screen data to the user interface unit 202, and instructs the user interface unit 202 to output the data broadcasting image to the monitor 30. If the user operates the cursor, red, yellow, blue and green buttons, or the like, the data broadcasting processing unit 1000 receives the instruction according to this operation via the user interface unit 202. Then the data broadcasting processing unit 1000 controls the DOM object and/or the script object, so that the data broadcasting image is drawn or shifted according to user operation. The data broadcasting processing unit 1000 transfers the BML document for the initial screen to the subtitle expansion determination unit 1100. Depending on the written content of the startup document, only the DOM object and script object may be generated, and display screen data may not be generated. In such a case, the data broadcasting processing unit 1000 handles the BML document, which is specified to the transition destination in the script executed by pressing the "d" button, as the BML document for the initial screen.

<Choice Specifying Unit 502>

A choice specifying unit 502 specifies displayable subtitles out of the subtitles provided by the program, and transfers the information on the specified displayable subtitle information to the subtitle switching application unit 802. The choice specifying unit 502 specifies a list of displayable subtitles based on the subtitle management data obtained from the subtitle processing unit 302 and the determination result by the subtitle expansion determination unit 1100. Details on processing for the choice specifying unit 502 to specify displayable subtitles will be described later.

In the present embodiment, the choice specifying unit 502 constitutes the "specifying unit" in the present invention.

<Subtitle Expansion Determination Unit 1100>

A subtitle expansion determination unit 1100 analyzes the BML document for the initial screen obtained from the data broadcasting processing unit 1000, and determines whether a link for using the expanded subtitling service is available on the data broadcasting screen of the selected program. If the link for using the expanded subtitling service is available on the data broadcasting screen, the subtitle expansion determination unit 1100 analyzes the BML document for the initial screen, and obtains and stores the conditions to execute the expanded subtitle application corresponding to this expanded subtitling service. The condition to execute the application here refers to an argument of an application startup function written in the BML document. The subtitle expansion determination unit 1100 transfers the condition to execute the expanded subtitle application to the choice specifying unit 502. Details on the determination processing by the subtitle expansion determination unit 1100 will be described later.

<Subtitle Switching Application Unit 802>

A subtitle switching application unit 802 instructs the application processing unit 902 to obtain and execute the expanded subtitle application. At this time, the subtitle switching application unit 802 transfers the condition to execute the expanded subtitle application obtained from the choice specifying unit 502. Details on the subtitle switching processing by the subtitle switching application unit 802 will be described later.

In the present embodiment, the subtitle switching application unit 802 constitutes the "controlling unit" in the present invention.

<Choice Specifying Processing Flow>

Figure 12:
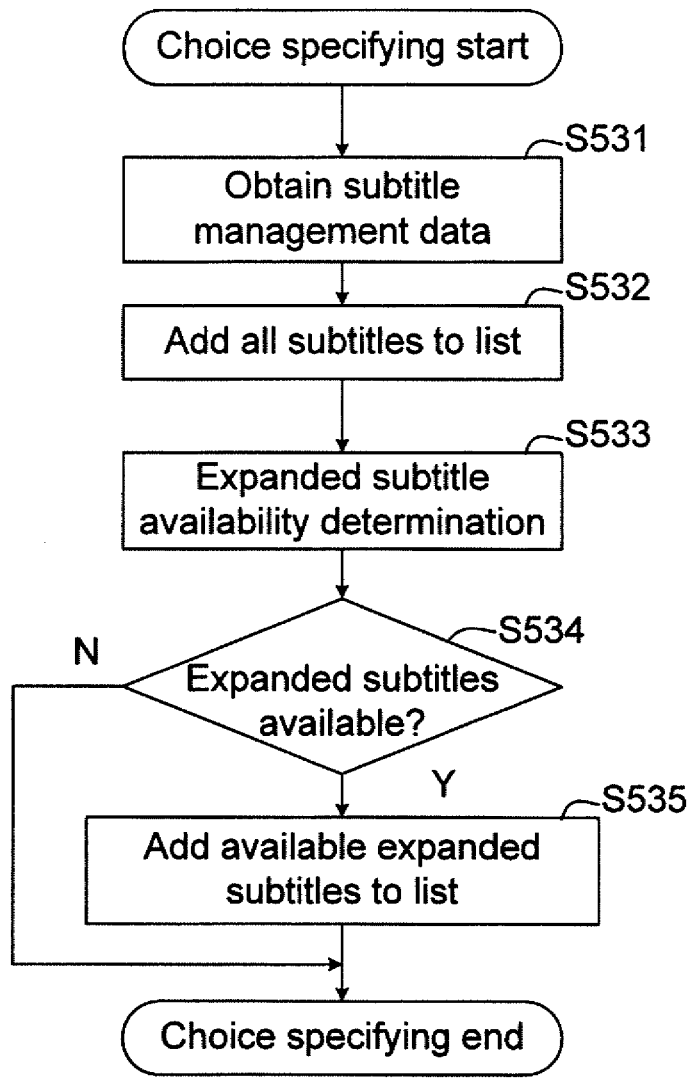
FIG. 12 is a flow chart depicting a processing by a choice specifying unit of Embodiment 3.

Processing for the choice specifying unit 502 to specify the choice of switchable subtitles will be described. FIG. 12 shows a flow chart depicting the processing executed by the choice specifying unit 502.

Since the processing contents of steps S531 and S532 of the flow chart in FIG. 12 are the same as the processing contents of steps S521 and S522 in FIG. 9, description thereof is omitted. After executing the processing in step S532, the choice specifying unit 502 instructs the subtitle expansion determination unit 1100 to determine whether a link, to use the expanded subtitling service, is available on the data broadcasting screen accompanying the selected program (S533). Details on the determination processing by the subtitle expansion determination unit 1100 will be described later.

The choice specifying unit 502 obtains the determination result from the subtitle expansion determination unit 1100.

If the obtained determination result is that a link to use the expanded subtitling service is available on the data broadcasting screen (Y in S534), the choice specifying unit 502 adds the expanded subtitle related to this expanded subtitling service to the list of displayable subtitles (S535), and ends processing.

On the other hand, if the obtained determination result is that a link to use the expanded subtitling service is not available on the data broadcasting screen (N in S534), then the choice specifying unit 502 ends processing without adding the expanded subtitle to the list of displayable subtitles.

<Subtitle Expansion Determination Flow>

Figure 13:
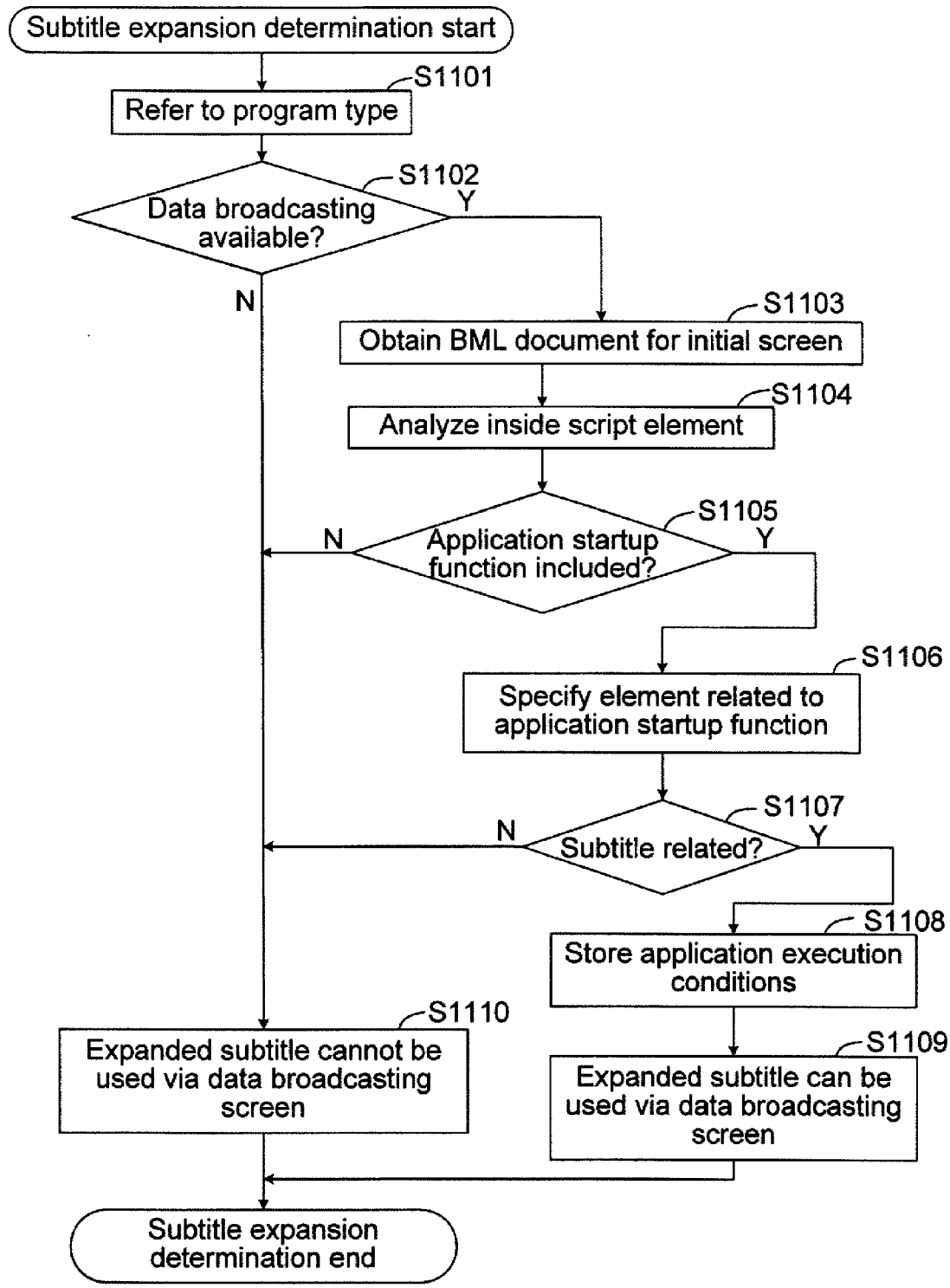
FIG. 13 is a flow chart depicting a processing by a subtitle expansion determination unit of Embodiment 3.

Processing for the subtitle expansion determination unit 1100, to determine whether a link to use the expanded subtitling service is available on the data broadcasting screen, will be described. FIG. 13 shows a flow chart depicting the processing executed by the subtitle expansion determination unit 1100.

When an instruction, to determine whether a link to use the expanded subtitling service is available on the data broadcasting screen of the selected program, is received from the choice specifying unit 502, the subtitle expansion determination unit 1100 obtains information on a program type of the selected program from the broadcasting receiving unit 102 (S1101). Then based on the information on the program type obtained from the broadcasting receiving unit 102, the subtitle expansion determination unit 1100 determines whether the program type of the selected program is a data added TV program or not (S1102).

If the program type of the selected program is not the data added TV program (N in S1102), the subtitle expansion determination unit 1100 determines that a link to use the expanded subtitling service is not available on the data broadcasting screen (S1110), and ends processing.

On the other hand, if the program type of the selected program is the data added TV program (Y in S1102), then the subtitle expansion determination unit 1100 obtains the BML document for the initial screen of the data broadcasting of the selected program from the data broadcasting processing unit 1000 (S1103).

The subtitle expansion determination unit 1100 analyzes the BML document for the initial screen (S1104), and determines whether an application startup function is included in the script element (S1105). In the case of the BML document for the initial screen shown in FIG. 14, for example, the application startup function is "launchXlet", and the portions including the application startup function in the script element are the portions indicated by (a), (b) and (c). Therefore in the case of the example in FIG. 14, it is determined that the application startup function is included in the script element of the BML document for the initial screen.

If the application startup function is not included in the script element of the BML document for the initial screen (N in S1105), the subtitle expansion determination unit 1100 determines that a link to use the expanded subtitling service is not available on the data broadcasting screen (S1110), and ends processing.

On the other hand, if the application startup function is included in the script element of the BML document for the initial screen (Y in S1105), the subtitle expansion determination unit 1100 advances to step S1107. In step S1107, the subtitle expansion determination unit 1100 determines whether an element to call up the script, including the application startup function, is an element on the expanded subtitling service (S1107). The element for calling up the script, including the application startup function, is determined by specifying the script including the application startup function, and searching for an element calling up this script. In the case of the example of the BML document for the initial screen shown in FIG. 14, the elements calling up the scripts (a), (b) and (c), including the application startup function, are the div elements of the portions indicated by (A), (B) and (C).

If the element for calling up the script, including the application startup function, is not an element related to the expanded subtitling service (N in S1107), the subtitle expansion determination unit 1100 determines that a link for using the expanded subtitling service is not available on the data broadcasting screen (S1110), and ends processing.

On the other hand, if the element for calling up the script, including the application startup function, is an element related to the expanded subtitling service (Y in S1107), the subtitle expansion determination unit 1100 stores the condition to execute the application (S1108). Then the subtitle expansion determination unit 1100 determines that a link for using the expanded subtitling service is available on the data broadcasting screen (S1109), and ends processing. In the present embodiment, whether an element is related to the expanded subtitling service or not is determined depending on whether "Subtitle" is included in the character strings in the element. In the case of the example of the BML document for the initial screen shown in FIG. 14, "Subtitle" is included in the character strings in the div element in (A) and (B), and "Subtitle" is not included in the character strings in the div element in (C), so the div elements in (A) and (B) are determined as the elements related to the expanded subtitling service. The argument "jimaku_hangul" of the application startup function launchXlet included in the script hangul( ), called up by the div element of (A), is stored as the condition to execute the expanded subtitle application of the Hangul subtitle. The argument "jimaku_arabic" of the application startup function launchXlet included in the script arabic( ), called up by the div element of (B), is stored as the condition to execute the expanded subtitle application of the Arabic subtitle. The method for determining whether the element is related to the expanded subtitle or not is not limited to the above mentioned example. For example, whether the element is related to the expanded subtitling service or not may be determined with reference to the attribute value of the element for calling up the script, other meta data, or the like.

By the above mentioned processing, a list of displayable subtitles is specified. Based on this list of displayable subtitles, the subtitle switching application unit 802 constructs the subtitle switching screen in the same manner as Embodiment 1 and Embodiment 2. On this subtitle switching screen, both the standard subtitles and expanded subtitles, links for using which are available on the data broadcasting screen may be presented as choices of switchable subtitles.

<Subtitle Switching Processing Flow>

Figure 15:
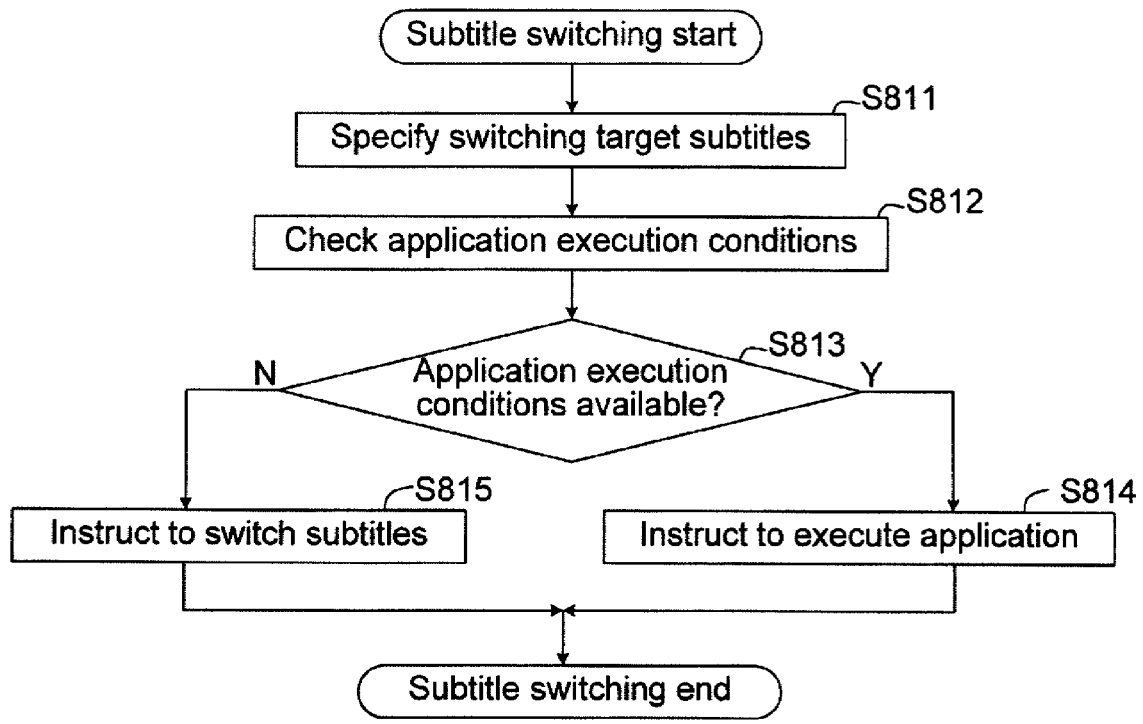
FIG. 15 is a flow chart depicting a processing by a subtitle switching application unit of Embodiment 3.

Processing for the subtitle switching application unit 802 to switch subtitles according to the subtitle switching instruction from the user interface unit 202 will be described. FIG. 15 shows a flow chart depicting the processing executed by the subtitle switching application unit 802.

When an instruction to execute the subtitle switching processing is received from the user interface unit 202, the subtitle switching application unit 802 specifies the switching target subtitle (S811). Since the method for specifying the switching target subtitle is the same as Embodiment 1, the description thereof is omitted. The subtitle switching application unit 802 obtains the condition to execute the expanded subtitle application, stored in association with each expanded subtitle, from the choice specifying unit 502 (S812). Then the subtitle switching application unit 802 determines whether the condition to execute the expanded subtitle application, stored in association with the switching target subtitle, is available (S813).

If the condition to execute the expanded subtitle application in association with the switching target subtitle is not available (N in S813), the subtitle switching application unit 802 determines that the switching target subtitle is a standard subtitle. Then the subtitle switching application unit 802 instructs the subtitle processing unit 302 to display the switching target subtitle (S815), and ends processing.

On the other hand, if the condition to execute the expanded subtitle application in association with the switching target subtitle is available (Y in S813), the subtitle switching application unit 802 determines that the switching target subtitle is an expanded subtitle. Then the subtitle switching application unit 802 instructs the application processing unit 902 to execute the expanded subtitle application corresponding to the switching target subtitle according to this execution condition (S814), and ends processing.

According to the present embodiment, even if a link for accessing the expanded subtitling service is available on the data broadcasting screen, and the expanded subtitling service is expected to be accessed by performing a predetermined operation on the data broadcasting screen, both the standard subtitles and expanded subtitles can be presented on the subtitle switching screen as choices. Therefore the user can select and use a desired subtitle, out of the standard subtitles and expanded subtitles provided for the selected program, simply by pressing the "Subtitle" button, which has been performed as a general operation, without requiring displaying the data broadcasting screen.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-226578, filed on Sep. 30, 2009 and Japanese Patent Application No. 2010-169304, filed on Jul. 28, 2010, which are hereby incorporated by reference herein in its entirety.

What is claimed is:

1. A digital broadcasting receiving apparatus for receiving digital broadcasting program data, comprising:

a receiving unit which receives digital broadcasting program data, including video data of the program, audio data of the program, and data linked to the program, the data linked to the program including subtitle text data of standard subtitles and expanded subtitles, and character expansion applications corresponding to the expanded subtitles;

a subtitle processing unit which can obtain the subtitle text data of the standard subtitles from the digital broadcasting program data and decode the subtitle text data;

a support possibility determination unit which determines whether the subtitle processing unit can decode the expanded subtitle by obtaining subtitle management data indicating a language code of the expanded subtitle, from the digital broadcasting program data, and comparing the subtitle management data with character support information indicating language codes which the subtitle processing unit can decode, the support possibility determination unit determining that the subtitle processing unit can decode the expanded subtitle of which language code is included in the character support information, and determining that the subtitle processing unit cannot decode the expanded subtitle of which language code is not included in the character support information;

a character expansion application availability determination unit which determines whether the character expansion application corresponding to the expanded subtitle which is determined by the support possibility determination unit that the subtitle processing unit cannot decode is included in the digital broadcasting program data;

a user interface unit which presents the standard subtitles, expanded subtitles which are determined by the support possibility determination unit that the subtitle processing unit can decode, and expanded subtitles which are determined by the character expansion application availability determination unit that the character expansion application corresponding thereto is included in the digital broadcasting program data, whose subtitle text data is included in the digital broadcasting program data of a selected program as choices of subtitles that a user can select; and an application processing unit which, when the user selects a choice of the expanded subtitle, obtains a character expansion application corresponding to the selected expanded subtitle from the digital broadcasting program data and executes the character expansion application to expand the function of the subtitle processing unit, so that the subtitle processing unit can decode the subtitle text data of the expanded subtitle, wherein the support possibility determination unit adds information indicating language code, decoding of which by the subtitle processing unit is enabled, to the character support information, if the application processing unit executes the character expansion application corresponding to the expanded subtitle, and the function of the subtitle processing unit is expanded.

2. The digital broadcasting receiving apparatus according to claim 1, wherein after the application processing unit executes the character expansion application corresponding to the expanded subtitle and the subtitle processing unit is enabled to decode the subtitle text data of the expanded subtitle, the application processing unit does not execute the character expansion application corresponding to the expanded subtitle when the user selects the choice of the expanded subtitle again.

3. The digital broadcasting receiving apparatus according to claim 1, wherein the support possibility determination unit which determines whether the subtitle processing unit can decode the expanded subtitle by obtaining subtitle management data indicating a character encoding method and a language code of the expanded subtitle, from the digital broadcasting program data, and comparing the subtitle management data with character support information indicating character encoding methods and language codes which the subtitle processing unit can decode, and the support possibility determination unit determines that the subtitle processing unit can decode the expanded subtitle of which both character encoding method and language code are included in the character support information, and determines that the subtitle processing unit cannot decode the expanded subtitle of which at least one of character encoding method and language code is not included in the character support information, wherein the support possibility determination unit adds information indicating character encoding methods and language codes, decoding of which by the subtitle processing unit are enabled, to the character support information, if the application processing unit executes the character expansion application corresponding to the expanded subtitle, and the function of the subtitle processing unit is expanded.

4. The digital broadcasting receiving apparatus according to claim 1 further comprising a remote controller having a subtitle button, wherein the user interface unit presents the standard subtitles and expanded subtitles, expanded subtitles which are determined by the support possibility determination unit that the subtitle processing unit can decode, and expanded subtitles which are determined by the character expansion application availability determination unit that the character expansion application corresponding thereto is included in the digital broadcasting program data, whose subtitle text data is included in the digital broadcasting program data of a selected program as choices of subtitles that a user can select when the subtitle button on the remote controller is operated by the user.

5. A digital broadcasting receiving apparatus for receiving digital broadcasting program data, comprising:

a receiving unit which receives digital broadcasting program data including video data of the program, audio data of the program, and data linked to the program, the data linked to the program including subtitle text data of standard subtitles and expanded subtitle applications;

a subtitle processing unit which can obtain the subtitle text data of the standard subtitles from the digital broadcasting program data and decode the subtitle text data;

a specifying unit which obtains information indicating expanded subtitle applications included in the digital broadcasting program data of a selected program, and specifies the expanded subtitle applications which can be obtained from the digital broadcasting program data of the selected program when an operation of program selection is performed by a user;

a remote controller having a subtitle button;

a user interface unit which presents the standard subtitles whose subtitle text data is included in the digital broadcasting program data of the selected program and expanded subtitles corresponding to the expanded subtitle applications which can be obtained from the digital broadcasting program data of the selected program as choices of subtitles that the user can select when the subtitle button on the remote controller is operated by the user; and an application processing unit which, when the user selects a choice of the expanded subtitle, obtains an expanded subtitle application corresponding to the selected expanded subtitle from the digital broadcasting program data, and executes the expanded subtitle application, so as to decode subtitle text data of the expanded subtitles.

6. The digital broadcasting receiving apparatus according to claim 5, wherein the specifying unit specifies the expanded subtitle applications which can be obtained from the digital broadcasting program data by obtaining an Application Information Table from the digital broadcasting program data, and identifying types of applications described in the Application Information Table.

7. The digital broadcasting receiving apparatus according to claim 5, wherein the specifying unit specifies the expanded subtitle applications which can be obtained from the digital broadcasting program data by obtaining a document written in a markup language for constructing a data broadcasting image from the digital broadcasting program data, and identifying an application startup function written in the document.

8. A method for controlling a digital broadcasting receiving apparatus which has a receiving unit which receives digital broadcasting program data, including video data of the program, audio data of the program, and data linked to the program, the data linked to the program including subtitle text data of standard subtitles and expanded subtitles, and character expansion applications corresponding to the expanded subtitles; and a subtitle processing unit which can obtain the subtitle text data of the standard subtitles from the digital broadcasting program data, and decode the subtitle text data, comprising:

a support possibility determination step of determining whether the subtitle processing unit can decode the expanded subtitle by obtaining subtitle management data indicating a language code of the expanded subtitle, from the digital broadcasting program data, and comparing the subtitle management data with character support information indicating language codes which the subtitle processing unit can decode, in the support possibility determination step it is determined that the subtitle processing unit can decode the expanded subtitle of which language code is included in the character support information, and is determined that the subtitle processing unit cannot decode the expanded subtitle of which language code is not included in the character support information;

a character expansion application availability determination step of determining whether the character expansion application corresponding to the expanded subtitle which is determined in the support possibility determination step that the subtitle processing unit cannot decode is included in the digital broadcasting program data;

a presenting step of presenting the standard subtitles, expanded subtitles which are determined in the support possibility determination step that the subtitle processing unit can decode, and expanded subtitles which are determined in the character expansion application availability determination step that the character expansion application corresponding thereto is included in the digital broadcasting program data, whose subtitle text data is included in the digital broadcasting program data of a selected program as choices of subtitles that a user can select; and an application processing step of, when the user selects a choice of the expanded subtitle, obtaining a character expansion application corresponding to the selected expanded subtitle from the digital broadcasting program data and executing the character expansion application to expand the function of the subtitle processing unit, so that the subtitle processing unit can decode the subtitle text data of the expanded subtitle, wherein information indicating language code, decoding of which by the subtitle processing unit is enabled, is added to the character support information in the support possibility determination step, if the character expansion application corresponding to the expanded subtitle is executed in the application processing step, and the function of the subtitle processing unit is expanded.

9. The method for controlling a digital broadcasting receiving apparatus according to claim 8, wherein after the character expansion application corresponding to the expanded subtitle is executed in the application processing step and the subtitle processing unit is enabled to decode the subtitle text data of the expanded subtitle, the character expansion application corresponding to the expanded subtitle is not executed in the application processing step when the user selects the choice of the expanded subtitle again.

10. The method for controlling a digital broadcasting receiving apparatus according to claim 8, wherein in the support possibility determination step, it is determined whether the subtitle processing unit can decode the expanded subtitle by obtaining subtitle management data indicating a character encoding method and a language code of the expanded subtitle, from the digital broadcasting program data, and comparing the subtitle management data with character support information indicating character encoding methods and language codes which the subtitle processing unit can decode and in the support possibility determination step it is determined that the subtitle processing unit can decode the expanded subtitle of which both character encoding method and language code are included in the character support information, and is determined that the subtitle processing unit cannot decode the expanded subtitle of which at least one of character encoding method and language code is not included in the character support information, wherein information indicating character encoding methods and language codes, decoding of which by the subtitle processing unit are enabled, is added to the character support information in the support possibility determination step, if the character expansion application corresponding to the expanded subtitle is executed in the application processing step, and the function of the subtitle processing unit is expanded.

11. The method for controlling a digital broadcasting receiving apparatus according to claim 8, the digital broadcasting receiving apparatus further comprising a remote controller having a subtitle button, wherein the standard subtitles, expanded subtitles which are determined in the support possibility determination step that the subtitle processing unit can decode, and expanded subtitles which are determined in the character expansion application availability determination step that the character expansion application corresponding thereto is included in the digital broadcasting program data, whose subtitle text data is included in the digital broadcasting program data of a selected program is presented as choices of subtitles that a user can select in the presenting step when the subtitle button on the remote controller is operated by the user.

12. A method for controlling a digital broadcasting receiving apparatus which has a receiving unit which receives digital broadcasting program data, including video data of the program, audio data of the program, and data linked to the program, the data linked to the program including subtitle text data of standard subtitles and expanded subtitle applications; a subtitle processing unit which can obtain the subtitle text data of the standard subtitles from the digital broadcasting program data and decode the subtitle text data; and a remote controller having a subtitle button, comprising:

a specifying step of obtaining information indicating expanded subtitle applications included in the digital broadcasting program data of a selected program, and specifying the expanded subtitle applications which can be obtained from the digital broadcasting program data of the selected program when an operation of program selection is performed by a user;

a presenting step of presenting the standard subtitles whose subtitle text data is included in the digital broadcasting program data of the selected program and expanded subtitles corresponding to the expanded subtitle applications which can be obtained from the digital broadcasting program data of the selected program as choices of subtitles which the user can select when the subtitle button on the remote controller is operated by the user; and an application processing step of, when the user selects a choice of the expanded subtitle, obtaining an expanded subtitle application corresponding to the selected expanded subtitle from the digital broadcasting program data, and executing the expanded subtitle application, so as to decode subtitle text data of the expanded subtitle.

13. The method for controlling a digital broadcasting receiving apparatus according to claim 12, wherein the expanded subtitle applications which can be obtained from the digital broadcasting program data is specified in the specifying step by obtaining an Application Information Table from the digital broadcasting program data, and identifying types of applications described in the Application Information Table.

14. The method for controlling a digital broadcasting receiving apparatus according to claim 12, wherein the expanded subtitle applications which can be obtained from the digital broadcasting program data is specified in the specifying step by obtaining a document written in a markup language for constructing a data broadcasting image from the digital broadcasting program data, and identifying an application startup function written in the document.

* * * * *